United States Patent
Yasuda

[11] Patent Number: 6,158,826
[45] Date of Patent: Dec. 12, 2000

[54] APPARATUS AND METHOD FOR CONTROLLING YAWING MOTION VARIABLE FOR AUTOMOTIVE VEHICLE

[75] Inventor: Sota Yasuda, Kanagawa, Japan

[73] Assignee: Nissan Motor Co., Ltd., Yokohama, Japan

[21] Appl. No.: 09/078,139

[22] Filed: May 14, 1998

[30] Foreign Application Priority Data

May 16, 1997 [JP] Japan .................................. 9-127435

[51] Int. Cl.⁷ .................................................. B60K 17/348
[52] U.S. Cl. ........................... 303/191; 303/146; 303/176
[58] Field of Search .................................. 303/146, 147, 303/148, 149, 191, 176

[56] References Cited

U.S. PATENT DOCUMENTS

| | | | |
|---|---|---|---|
| 3,710,957 | 1/1973 | Small | 214/16.1 |
| 4,039,089 | 8/1977 | Kochanneck | 214/16.1 |
| 4,998,593 | 3/1991 | Karnopp et al. | 303/146 |
| 5,344,224 | 9/1994 | Yasuno | 303/100 |
| 5,437,536 | 8/1995 | Bianca | 414/259 |
| 5,488,555 | 1/1996 | Asgari et al. | 364/424 |
| 5,566,776 | 10/1996 | Iwata | 180/197 |
| 5,575,542 | 11/1996 | Tanaka et al. | 303/125 |
| 5,584,541 | 12/1996 | Sone et al. | 303/146 |
| 5,620,239 | 4/1997 | Mihara et al. | 303/121 |
| 5,646,841 | 7/1997 | Suzuki et al. | 303/140 |
| 5,727,854 | 3/1998 | Pueschel et al. | 303/155 |
| 5,899,952 | 5/1999 | Fukada | 303/146 |
| 5,944,393 | 8/1999 | Sano | 303/146 |

FOREIGN PATENT DOCUMENTS

| | | |
|---|---|---|
| 2-70561 | 3/1990 | Japan . |
| 3-31030 | 2/1991 | Japan . |
| 5-24528 | 2/1993 | Japan . |
| 5-193332 | 8/1993 | Japan . |
| 6-40317 | 2/1994 | Japan . |
| 6-87419 | 3/1994 | Japan . |
| 8-156816 | 6/1996 | Japan . |
| 9-11882 | 1/1997 | Japan . |

*Primary Examiner*—Matthew C. Graham
*Attorney, Agent, or Firm*—Foley & Lardner

[57] ABSTRACT

Disclosed are apparatus and method for controlling a yawing motion variable such as a yaw rate for an automotive vehicle in which a) detecting the yawing motion variable which is actually developed in the vehicle is detected, a vehicular running status information except the yawing motion variable is detected, a target yawing motion variable is calculated on the basis of the vehicular running status information, a determination of whether the vehicle is stopped on the basis of the vehicular running status information is made a feedback control of the yawing motion variable is carried out so that the detected yawing motion variable is coincident with the target yawing motion variable, the feedback control of the yawing motion variable being suspended at least when the vehicle is stopped. The suspension (inhibit) of the feedback control of the yawing motion variable is carried out when the vehicle is parked on such a turn table or movable platform as found in a parking machine to enter the vehicle in such a tower parking such as a multi-floor parking building.

22 Claims, 15 Drawing Sheets

APPARATUS AND METHOD FOR CONTROLLING YAWING MOTION VARIABLE FOR AUTOMOTIVE VEHICLE

The contents of Application No. Heisei 9-127435, with the filing date of May 16, 1997, is herein incorporated by reference.

BACKGROUND OF THE INVENTION (1) Field of the Invention

The present invention generally relates to apparatus and method for controlling a yawing motion variable for an automotive vehicle in which a target yawing motion variable is calculated on the basis of a vehicular running status information such as a vehicular steering angular displacement and a vehicle speed and a feedback control of a yawing motion variable is performed so that the yawing motion variable which is actually developed in the vehicle is coincident with the target yawing motion variable.

More particularly, the present invention relates to the apparatus and method for controlling the yawing motion variable applicable to; a four wheel steering system in which steered angles of respective four wheels are independently and individually controllable; to a driving force control apparatus such as a engagement force controller or a differential limit torque controller of a driving force distribution clutch between front and rear road wheel pairs or between left and right road wheel pairs; to a braking force control apparatus for wheel cylinders disposed for the respective road wheels of the vehicle; to a stabilizer control apparatus in which a roll rigidity between the left and right road wheel pairs is variable; to an active suspension control apparatus; or to a road wheel weight control apparatus in order to enable the feedback control of the yawing motion variable. The yawing motion variable includes a yaw rate.

(2) Description of the Related Art

Each of two previously proposed yawing motion variable controlling apparatuses which is applied to the braking force controlling system is exemplified by Japanese Patent Application First Publications No. Heisei 2-70561 published on Mar. 9, 1990 and Heisei 6-87419 published on Mar. 29, 1994.

In each of these previously proposed yawing motion variable controlling apparatuses disclosed in the above-identified Japanese Patent Application First Publications, a controlled variable is detected as a yaw rate, a target yaw rate is calculated from a vehicular steering angle (angular displacement) and a vehicle speed, a braking force, particularly, a difference in the braking force between a left and right road wheel pair and/or between a front and rear road wheel pair is feedback controlled.

Another previously proposed yawing motion variable controlling apparatus which has been applied to an engagement force controlling apparatus for a driving force distribution clutch between the front and rear road wheel pair or between the left and right road wheel pair is exemplified by a Japanese Patent Application First Publication No. Heisei 3-31030 published on Feb. 8, 1991.

A still another previously proposed yawing motion variable controlling apparatus which has been applied to an active suspension controlling apparatus or to a vehicular stabilizer controlling apparatus, both apparatuses of which enabling a variable control over a rolling rigidity, is exemplified by a Japanese Patent Application First Publication No. Heisei 5-193332 published on Aug. 3, 1993.

A further another previously proposed yawing motion variable controlling apparatus which has been applied to a vehicular braking force controlling apparatus in which braking forces imposed on respective road wheels are independently and individually controlled is exemplified by a Japanese Patent Application First Publication No. Heisei 5-24528 published on Feb. 2, 1993 (which corresponds to a U.S. Pat. No. 5,344,224).

A still further another previously proposed yawing motion variable controlling apparatus which has been applied to a vehicular four wheel steering system is exemplified by a Japanese Patent Application First Publication No. Heisei 8-156816 published on Aug. 18, 1996.

SUMMARY OF THE INVENTION

Since, in each of the previously proposed yawing motion variable controlling apparatuses, a feedback control such that the yawing motion variable becomes a target value is performed, it is possible to perform such a control that a previously set vehicular characteristic can always be achieved at least during a vehicular running. However, since, like many feedback control apparatuses, such a determination as to whether an external disturbance invading into a feedback control loop is a disturbance to be eliminated therefrom to achieve a predetermined vehicular characteristic or a disturbance to be neglected cannot be carried out. Hence, there is a possibility that an unnecessary controlled variable such as the yaw rate is often outputted according to situations.

For example, suppose that, in each of the previously proposed yawing motion variable controlling apparatuses, a yawing motion is forcefully given to the vehicle due to a vehicle body rotation by means of a turn table (or movable platform as will be described later) on which the vehicle is rested during a vehicular stopped state. In this case, there is a possibility of outputting the unnecessary controlled variable so as to correct the yawing motion which is not the yawing motion that naturally develops in the vehicle during the vehicular running.

It is therefore an object of the present invention to provide apparatus and method for controlling a yawing motion variable for an automotive vehicle which suspend a feedback control of the yawing motion variable during a vehicular stopped state such that the feedback control of the yawing motion variable cannot be made in this situation so as to achieve no output of an unnecessary controlled variable.

The above-described object can be achieved by providing an apparatus for an automotive vehicle comprising: a yawing motion variable detector for detecting a yawing motion variable which is actually developed in the vehicle; a vehicular running status information detector for detecting a vehicular running status information except the yawing motion variable; a target yawing motion variable calculator for calculating a target yawing motion variable on the basis of the vehicular running status information; a vehicular stopped state determinator for determining whether the vehicle is stopped on the basis of the vehicular running status information; and a feedback controller for carrying out a feedback control of the yawing motion variable so that the detected yawing motion variable is coincident with the target yawing motion variable, the feedback controller having a feedback control suspender for suspending the feedback control of the yawing motion variable at least when the vehicular stopped state determinator determines that the vehicle is stopped.

The above-described object can also be achieved by providing an apparatus for an automotive vehicle comprising: yawing motion variable detecting means for detecting a yawing motion variable which is actually developed in the vehicle; target yawing motion variable calculating means for calculating a target yawing motion variable on the basis of a vehicular running status information; vehicular stopped state detecting means for determining whether the vehicle is stopped; and a feedback controlling means for carrying out a feedback control of the yawing motion variable so that the detected yawing motion variable is coincident with the target yawing motion variable, the feedback controlling means having a feedback control suspending means for suspending the feedback control of the yawing motion variable at least when the vehicular stopped state detecting means detects that the vehicle is stopped.

The above-described object can also be achieved by providing a method for controlling a yawing motion variable for an automotive vehicle, comprising the steps of: a) detecting the yawing motion variable which is actually developed in the vehicle; b) detecting a vehicular running status information; c) calculating a target yawing motion variable on the basis of the vehicular running status information; d) determining whether the vehicle is stopped on the basis of the vehicular running status information; e) carrying out a feedback control of the yawing motion variable so that the detected yawing motion variable is coincident with the target yawing motion variable; and f) suspending the feedback control of the yawing motion variable at least when determining at the step d) that the vehicle is stopped.

BEST MODE FOR CARRYING OUT THE INVENTION

Reference will hereinafter be made to the drawings in order to facilitate a better understanding of the present invention.

Figure 1:
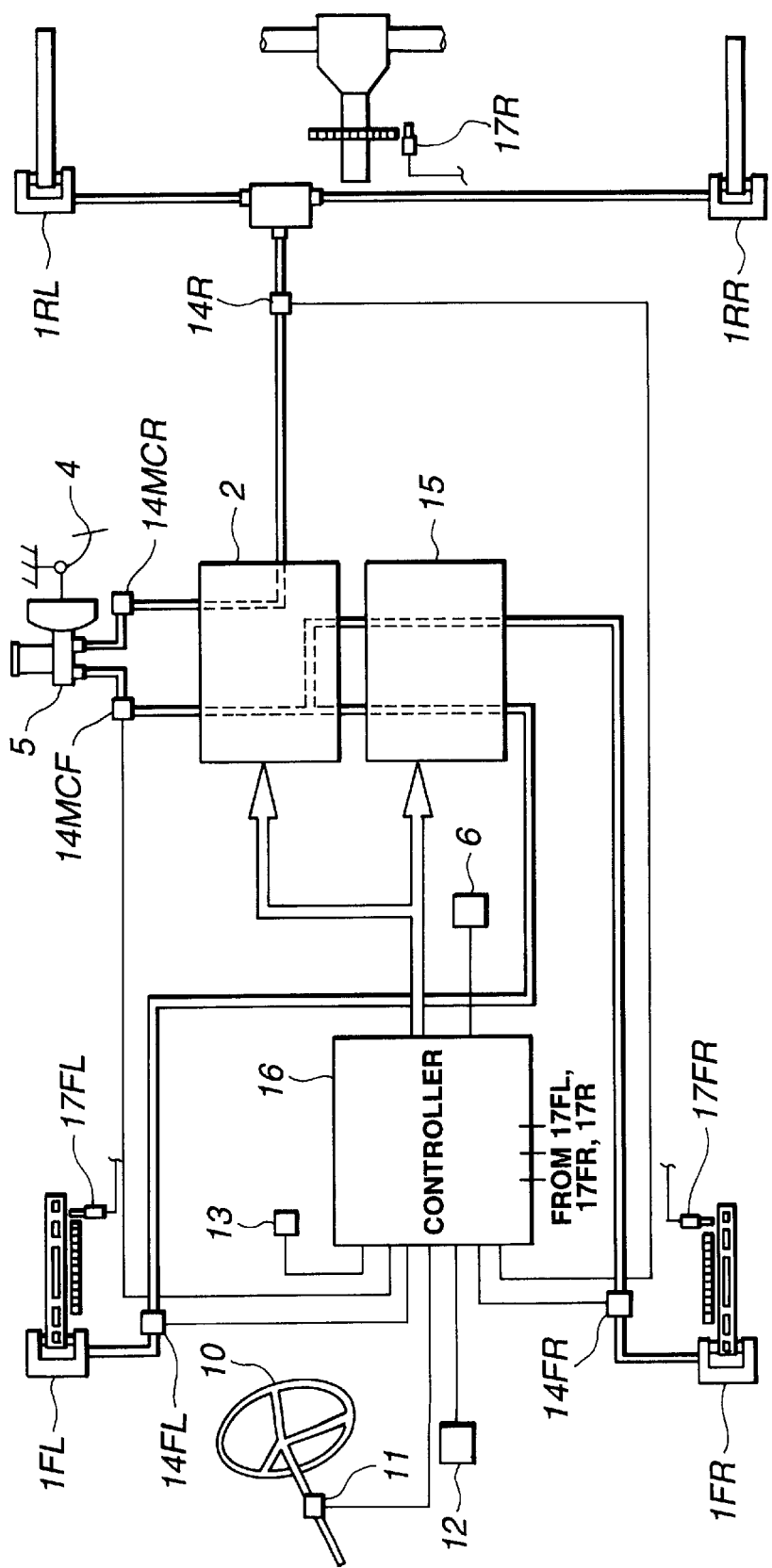
FIG. 1 is a schematic whole hydraulic-circuit-and-electronic-circuit block diagram of a braking force controlling apparatus to which a preferred embodiment of a yawing motion variable controlling apparatus for an automotive vehicle according to the present invention is applicable.

FIG. 1 shows a vehicular braking force controlling apparatus to which a yawing motion variable controlling apparatus in a preferred embodiment according to the present invention is applicable.

The vehicular braking force controlling apparatus shown in FIG. 1 is based on a U.S. Pat. No. 5,344,244 and enables independent and individual controls of braking forces imposed on a front left and right road wheel pair and enables the braking forces imposed on a rear left and right road wheel pair to be controlled in a pressure decrement direction.

In FIG. 1, front road wheel side wheel cylinders 1FL and 1FR (front left and right road wheel cylinders) are attached on front left and right road wheels (a front road wheel pair) as front braking means and rear road wheel side wheel cylinders 1RL and 1RR (rear left and right road wheel cylinders) are attached on rear left and right road wheels (a rear road wheel pair).

It is noted that FL denotes a front left road wheel side, FR denotes a front right road wheel side, RL denotes a rear left road wheel side, and RR denotes a rear right road wheel side.

Working fluid pressures (hereinafter, also simply referred to as wheel cylinder pressures) supplied to the front road wheel side wheel cylinders 1FL and 1FR are controlled by means of two of first (ABS) actuator 2 and second (TCS) actuator 15 and working fluid pressures (wheel cylinder pressures) supplied to the rear road wheel side wheel cylinders 1RL and 1RR are controlled only by means of the first (ABS) actuator 2.

Figure 2:
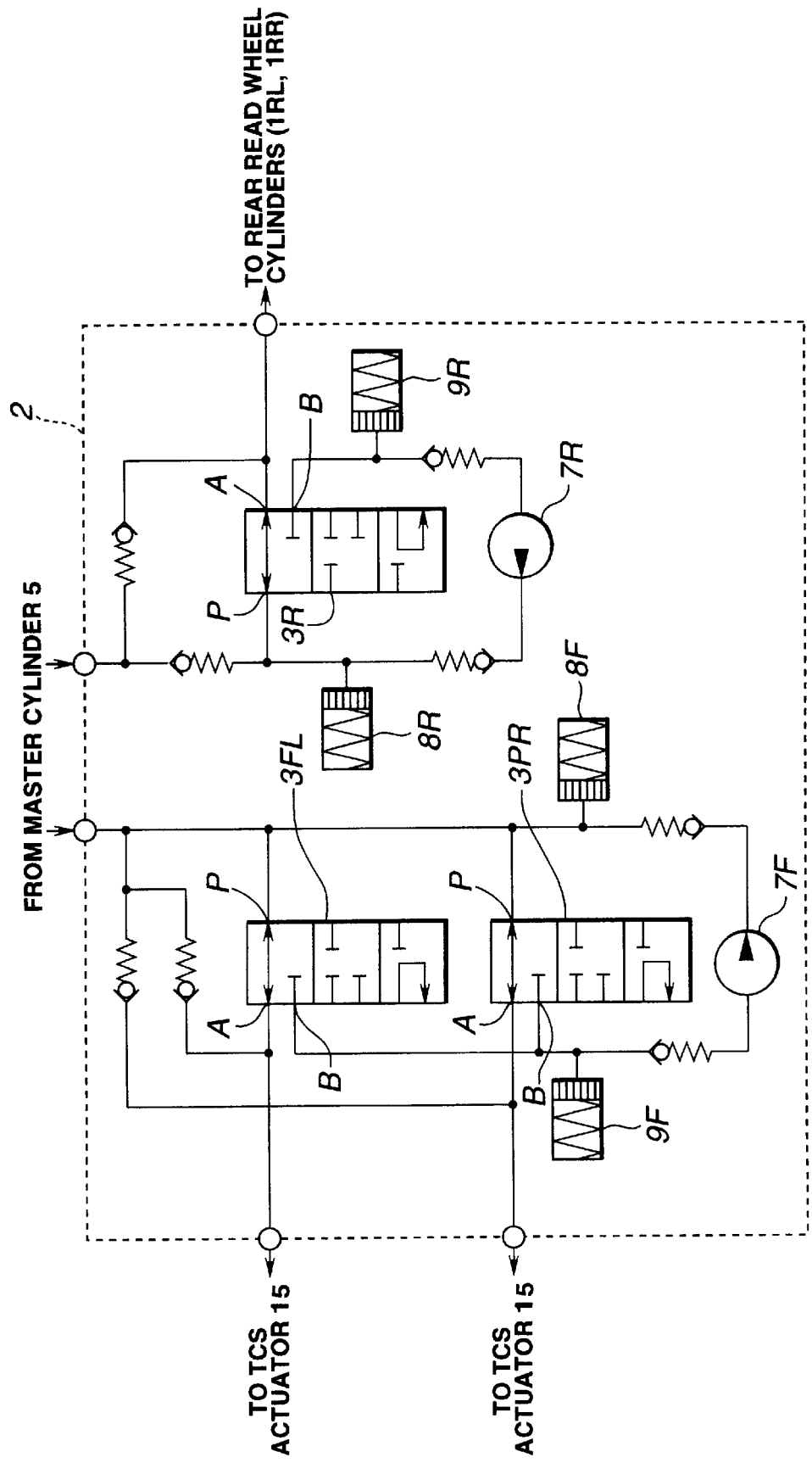
FIG. 2 is a hydraulic circuit block diagram of a first actuator shown in FIG. 1.

A detailed structure of the first actuator 2 is shown in FIG. 2.

As shown in FIG. 2, the first actuator 2 has the same structure as an anti- skid control (hereinafter, also simply referred to as ABS) purpose actuator.

Since the detailed structure of the anti-skid control purpose (first) actuator 2 is exemplified by a U.S. Pat. No. 5,344,224 issued on Sep. 6, 1994, (the disclosure of which is herein incorporated by reference) a brief explanation of the first actuator 2 will be made hereinbelow.

Each of front and rear road wheel side electromagnetic directional switching valves 3FL, 3FR, and 3R within the first actuator 2 controls the working fluid pressures supplied to the second actuator 15 or controls the rear road wheel side wheel cylinder pressure $P_R$ in a region equal to or below front and rear road wheel side working fluid pressures (hereinafter, also simply referred to as a master cylinder pressure) $P_{MCF}$ and $P_{MCR}$ from a master cylinder 5.

Each of the front road wheel side ABS switching valves 3FL and 3FR connects uninterruptedly between the master cylinder 5 and the second actuator 15 at a first switching position shown in FIG. 2 so that the corresponding working fluid pressure supplied to the second actuator 15 is in a pressure increment state in which it is increased up to the front road wheel side master cylinder pressure $P_{MCF}$, interrupts the connection between the second actuator 15, the master cylinder 5, and a working fluid pressure pump 7F at a second switching position so that the working fluid pressures in the second actuator 15 is held as they are, and connects between the second actuator 15 and the master cylinder 5 via the working fluid pressure pump 7F at a third switching position so that the working fluid pressures within the second actuator 15 are in a pressure decrement state in which they are returned to the master cylinder 5.

The three switching positions of each front ABS switching valve 3FL and 3FR are controlled according to three stages of current values of a control signal supplied from a braking force controller 16 as will be described later.

The braking force controller 16 corresponds to a yaw rate controller (hereinafter, also simply referred to as a controller).

The rear road wheel side ABS switching valve 3R connects uninterruptedly between the master cylinder 5 and the wheel cylinders 1RL and 1RR at the first switching position shown in FIG. 2 so that the rear road wheel cylinder pressure $P_R$ is in the pressure increment state in which it is increased up to the rear road wheel side master cylinder pressure $P_{MCR}$, interrupts the connection between the rear road wheel side wheel cylinders 1RL and 1RR, the master cylinder 5, and a working fluid pressure pump 7R at the second switching position so that the rear road wheel side wheel cylinder pressure $P_R$ is in the hold state in which it is held as it is, and connects between the rear road wheel side wheel cylinders 1RL and 1RR and the master cylinder 5 via the working fluid pressure pump 7R at the third switching position so that the rear road wheel side wheel cylinder pressure $P_R$ is in the pressure decrement state in which it is returned to the master cylinder 5.

These three switching positions are controlled according to three stages of the current value of the control signal derived from the braking force controller 16.

The second actuator 15 has the same structure as a traction control purpose (TCS) actuator. The TCS actuator is exemplified by the U.S. Pat. No. 5,344,224 (,the disclosure of which is herein incorporated by reference).

The second actuator 15 serves to supply or interrupt the supply of the working fluid pressures derived from the ABS actuator 2 into the front road wheel side wheel cylinders 1FL and 1FR and serves to independently and individually control the front road wheel side wheel cylinder pressures $P_{FL}$ and $P_{FR}$ So as to be equal to or higher than the front road wheel side master cylinder pressure $P_{MCF}$. A pressure responsive signal of a pressure switch 27 interposed between a working fluid pressure pump 26F and each of front road wheel side TCS switching valves 22FL and 22FR is used as a trigger signal inputted to the braking force controller 16 to drive or stop a working fluid pressure pump 26F or to drive a relief valve 29.

Figure 3:
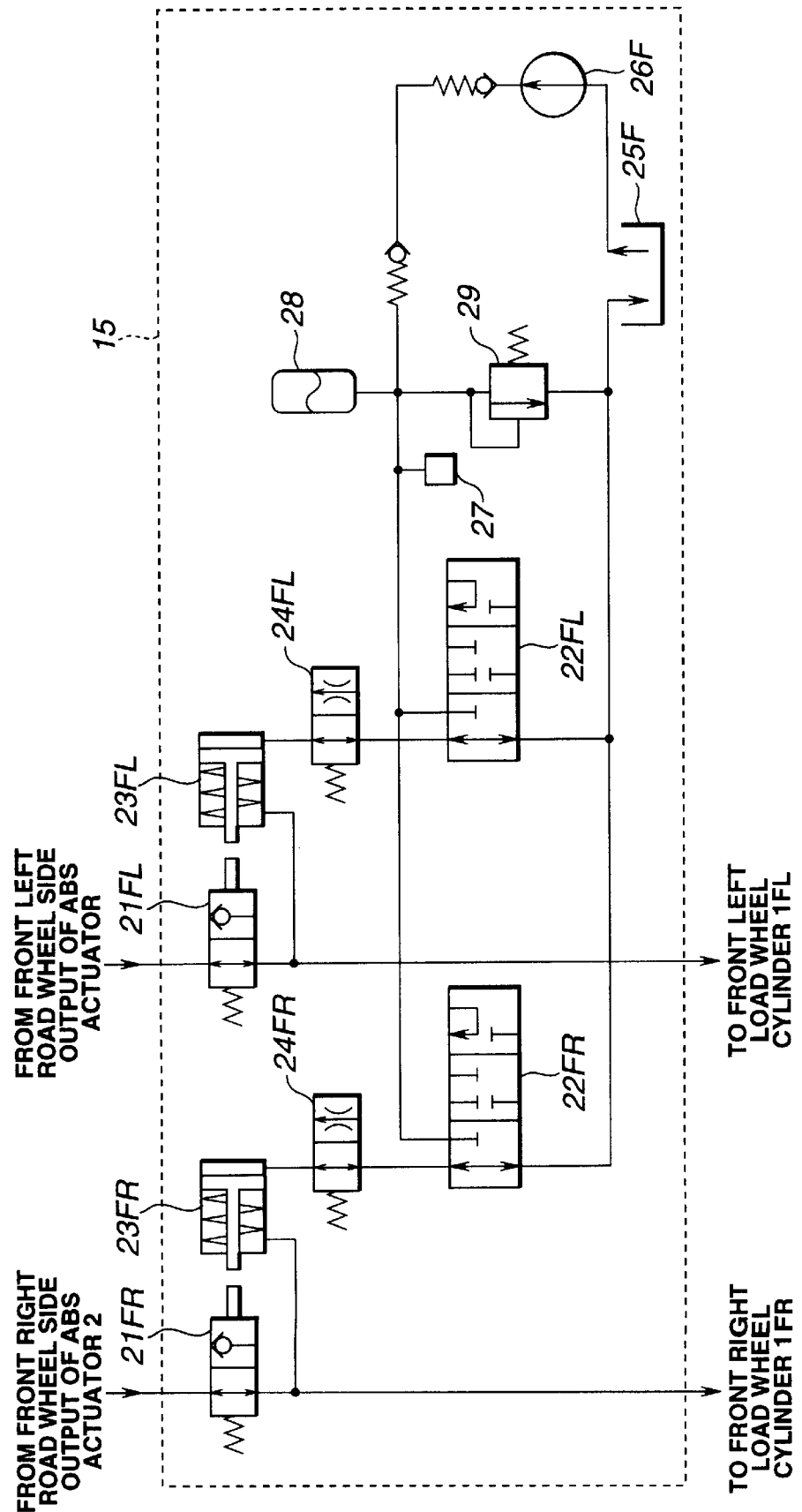
FIG. 3 is a hydraulic circuit block diagram of a second actuator shown in FIG. 1.

Each of electromagnetic directional switching valves 22FL and 22FR communicates plunger type pistons 23FL and 23FR to an accumulator 28 to forward the respectively corresponding pistons 23FL and 23FR at the third switching position shown in FIG. 3, thus the switching valves 21FL and 21FR switched so that the ABS actuator 2 (first actuator) is interrupted from the front road wheel side wheel cylinders 1FL and 1FR and, at the same time, the working fluid pressures within the pistons 23FL and 23FR are supplied and added to the first road wheel side wheel cylinders 1FR and 1FR to increase the front road wheel side wheel cylinder pressures $P_{FL}$ and $P_{FR}$ UP to pressure levels equal to or higher than the front road wheel side master cylinder pressure $P_{MCF}$.

Each of the switching valves 22FL and 22FR interrupts the connection between the plunger type pistons 23FL and 23FR and the accumulator 28 at the second switching position so that the respective front road wheel side wheel cylinder pressures $P_{FL}$ and $P_{FR}$ are held at the hold state.

In addition, each of the switching valves 22FL and 22FR communicates the plunger type pistons 23FL and 23FR to a reservoir tank 25F at the first switching position So that the respective front road wheel side wheel cylinder pressures $P_{FL}$ and $P_{FR}$ are in the pressure decrement states and, at the same time, the respective front road wheel side wheel cylinders 1FL and 1FR are connected to the first actuator 2.

These three switching positions thereof are controlled according to the three stages of the current value of the control signal derived from the braking force controller 16.

Figure 4:
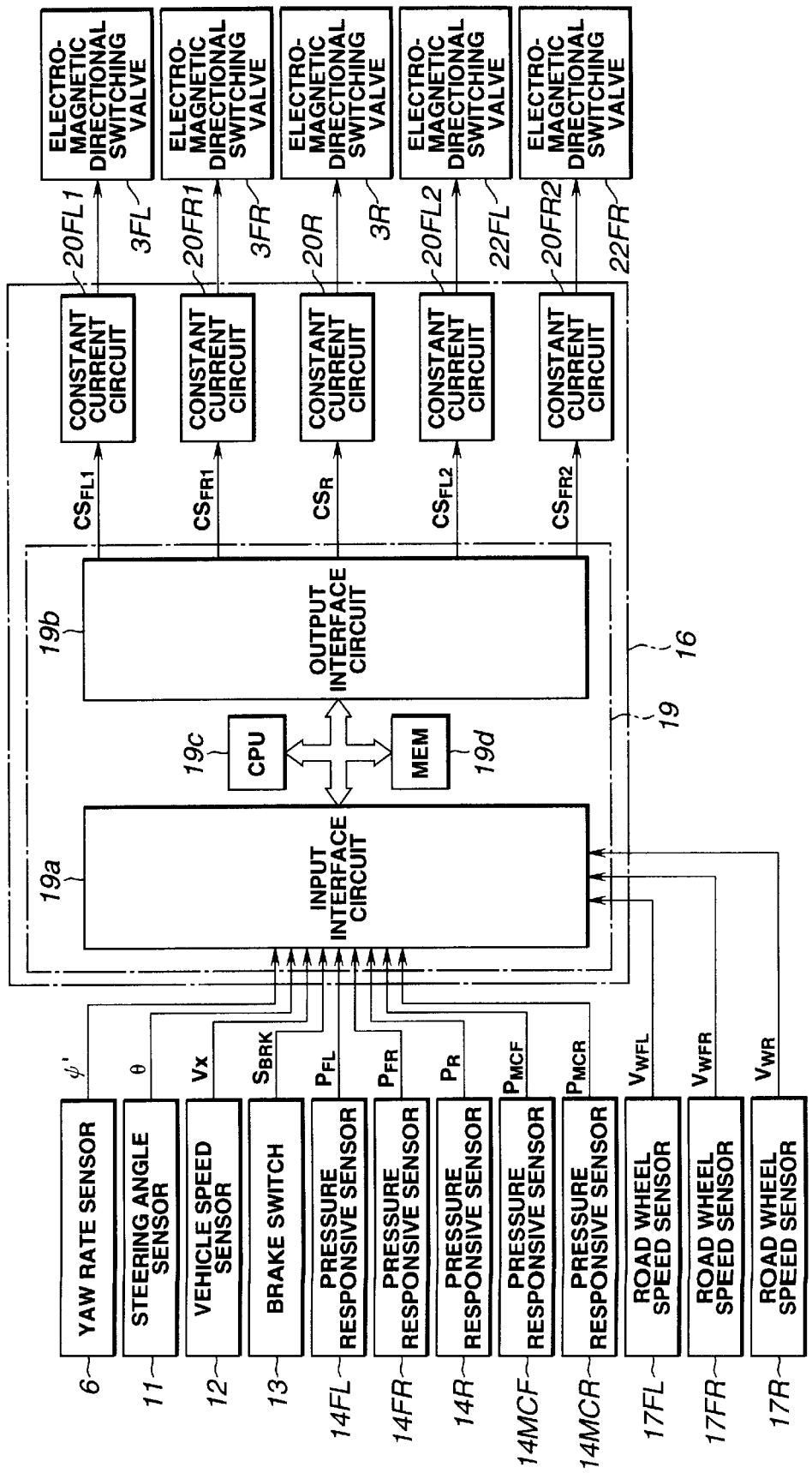
FIG. 4 is an electronic circuit block diagram of a yaw rate controller and its peripheral circuitry shown in FIG. 1.

On the other hand, as shown in FIGS. 1 and 4, an automotive vehicle in which the braking force controlling apparatus shown in FIG. 1 (the yawing motion variable controlling apparatus being applicable to the braking force controlling apparatus) is mounted is provided with: a yaw rate sensor 6 for detecting an actual yaw rate $\psi'$ developed in the vehicle; a steering angle sensor 11 for detecting a steering angular displacement (steering angle) θ of a steering wheel 10; a vehicle speed sensor 12 for detecting a vehicle speed Vx of the vehicle; a brake switch 13 for detecting whether a brake pedal 4 has been depressed to effect a vehicular brake and outputting a brake signal $S_{BRK}$ when the brake pedal 4 has been depressed; a plurality of pressure responsive sensors 14FL, 14FL, and 14R for detecting respective wheel cylinder pressures Pi (i=FL, FR, or R); pressure responsive sensors 14MCF and 14MCR for detecting separately and individually two-channel master cylinder pressures $P_{MCF}$ and $P_{MCR}$; road wheel speed sensors 17FL, 17FR, and 17R for detecting respective road wheel rotation speeds Vwi of the respective front left and right and the rear road wheels.

These sensor and switch signals are inputted to the braking force controller 16.

It is noted that although the actual yaw rate $\psi'$ from the yaw rate sensor 6 and the steering angular displacement θ from the steering angle sensor 11 have, for example, positive and negative directionalities, both directionalities between the steering angular displacement from the steering angle sensor 11 in the clockwise direction and the actual yaw rate $\psi'$ derived from the yaw rate sensor 6 are set so as to match with each other between the steering angular displacement in the clockwise direction and the actual yaw rate in the rightward direction.

It is also noted that the brake signal $S_{BRK}$ is a digital signal indicating a logic value of "1" (which corresponds to an ON state signal of the brake switch 13) when the brake pedal 4 has been depressed and indicating a logic value of "0" (which corresponds to an OFF state of the brake switch 13) when the brake pedal 4 has not been depressed.

FIG. 4 shows the braking force controller 16 and its peripheral circuitry.

As shown in FIG. 4, the braking force controller 16 includes: a microcomputer 19; floating type constant current circuits 20FL1, 20FR1, and 20R; and floating type constant current circuits 20FL2 and 20FR2.

The microcomputer 19 receives detection signals from the sensors and switches described above and outputs the control signals toward the respectively switching valves described above.

The constant current circuits 20FL1, 20FR1, and 20R receive individually the control signals CSFL1, CSFR1, and CSR from the microcomputer 19 and convert the control signals into respectively corresponding drive signals to output them to the respectively corresponding ABS switching valves 3FL, 3FR, and 3R of the first actuator 2.

The constant current circuits 20FL2 and 20FR2 receive individually the control signals CSFL2 and CSFR2 from the microcomputer 19 toward the TCS switching valves 22FL and 22FR and convert them into the respectively corresponding drive signals to output them to the TCS switching valves 20FL and 20FR.

The microcomputer 19 includes: an input interface circuit 19a having at least analog-to-digital (A/D) converter; an output interface circuit 19b having at least digital-to-analog (D/A) converter; a CPU 19c such as a microprocessor (MPU); a memory unit having a ROM (Read Only Memory) and a RAM (Random Access Memory); and a common bus.

FIGS. 6 through 13B show flowcharts executed by the microcomputer 19 of the braking force controller 16 to control a vehicular yawing motion variable in feedback mode as a timer interrupt routine.

It is noted that although, in the flowcharts shown in FIGS. 6 through 13B, steps to communicate with another communication station such as ROM, RAM or another microcomputer are not provided, programme or maps stored in the ROM and various data stored in the RAM are at any time transmitted to buffers in the CPU 19c and respective results of calculations executed by the CPU 19c are stored in the memory unit 19d.

Figure 5:
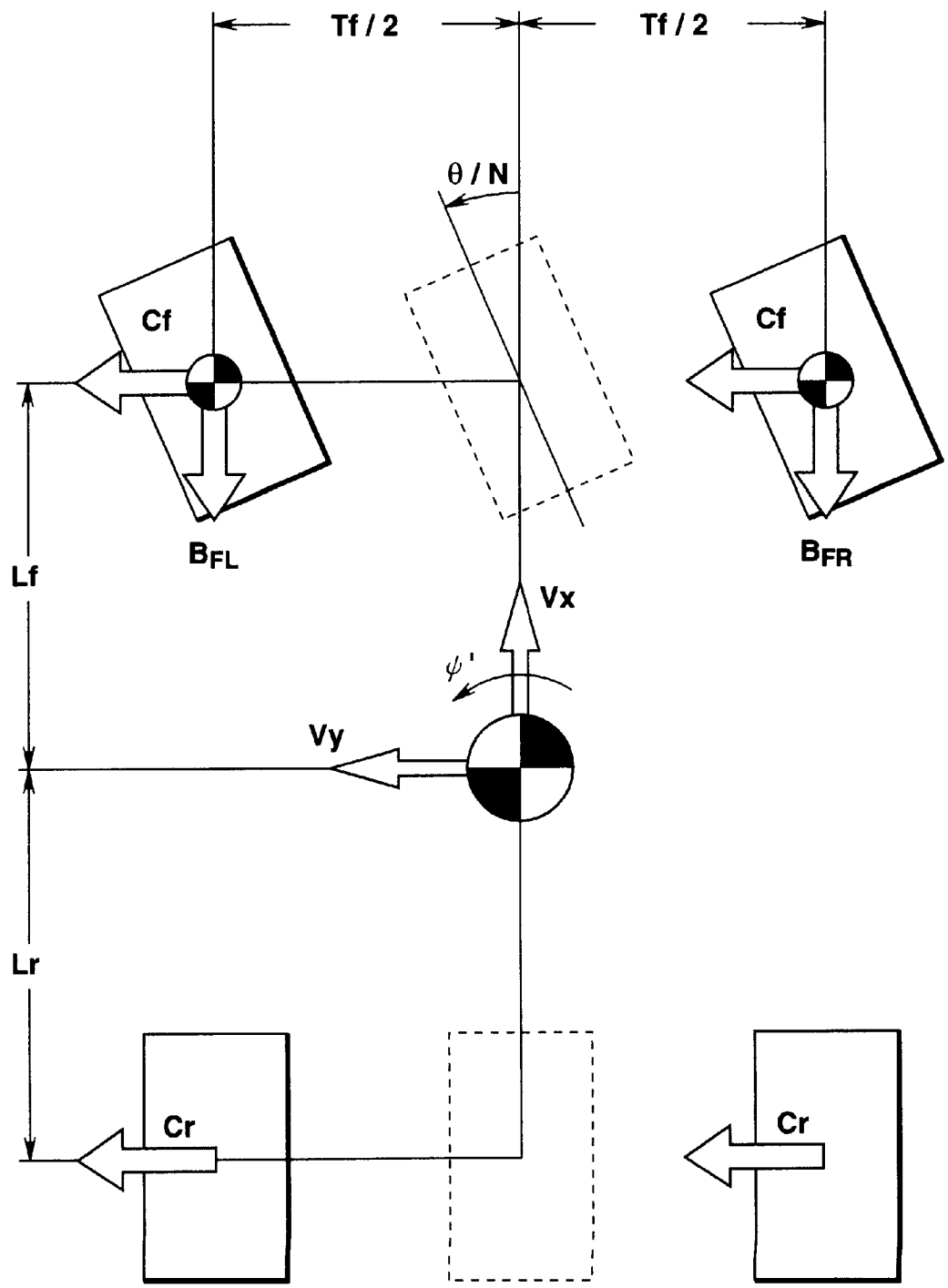
FIG. 5 is an explanatory model view of a vehicular motion model, for example, when the vehicle is turned left.

It is also noted that although a multiple number of calculation formulae derived from a vehicular motion equation are included in the flowcharts, a principle of derivations of these calculation formulae is referred to FIG. 5 and to the U.S. Pat. No. 5,344,224.

However, the disclosed invention in the above-identified United States Patent is that a yaw rate which is the yawing motion variable is estimated by means of a status observer and the braking force is controlled so that the estimated yaw rate becomes coincident with a target yaw rate. Since, in the embodiment of the yawing motion variable controlling apparatus, the present invention is put into practice, the braking force is controlled so that the yaw rate ψ' detected by the yaw rate sensor 6 becomes coincident with the target yaw rate ψ'r.

Figure 6:
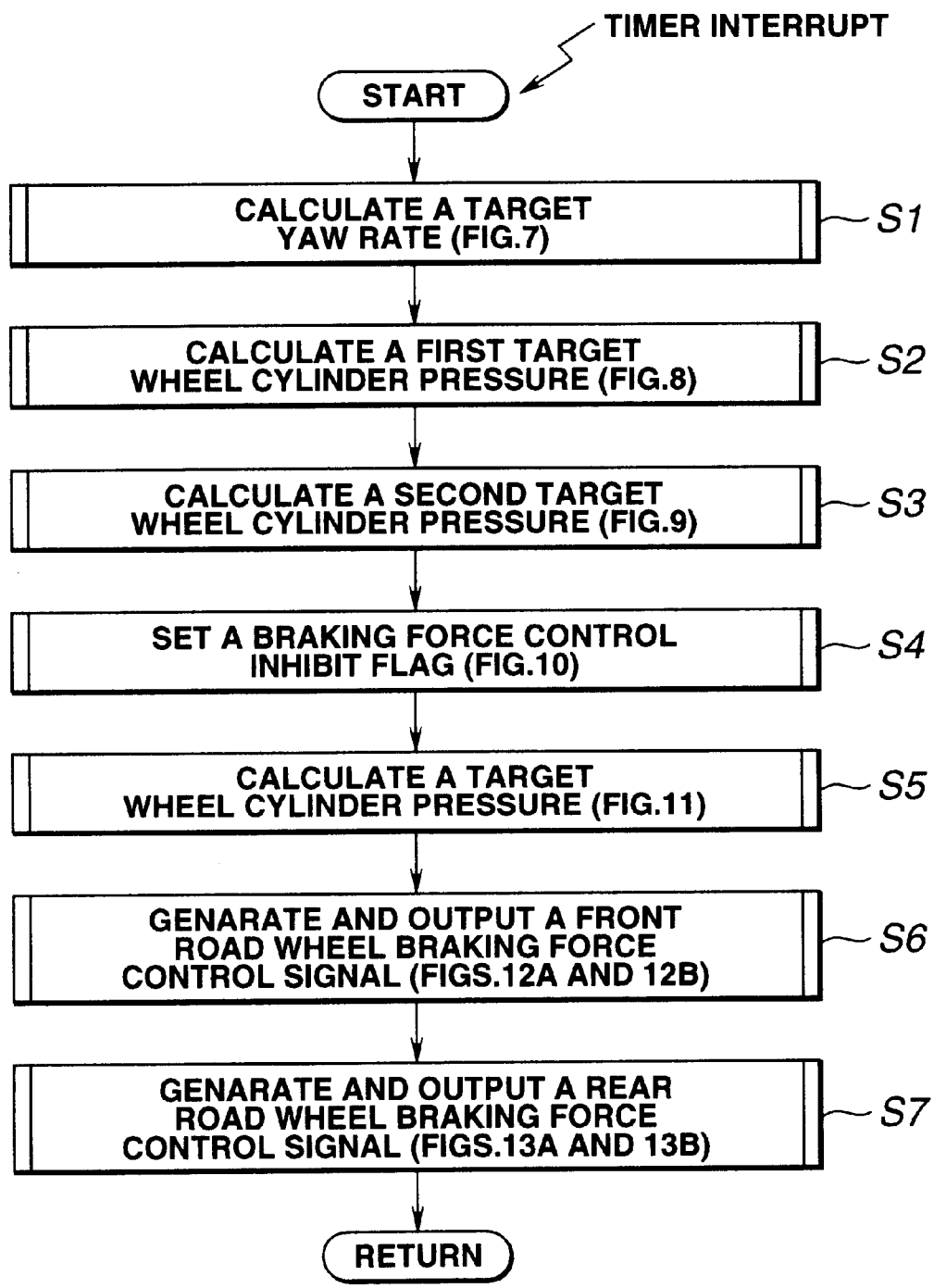
FIG. 6 is a generally flowchart of a driving force control routine executed by the yaw rate controller shown in FIG. 4.

First, FIG. 6 shows a general flowchart of a braking force control main routine executed as a timer interrupt whenever a predetermined sampling time ΔT, e.g., 0.1 milliseconds has passed.

At a step S1, the CPU 19c of the controller 16 calculates a target yaw rate as will be described later with reference to FIG. 7.

Figure 8:
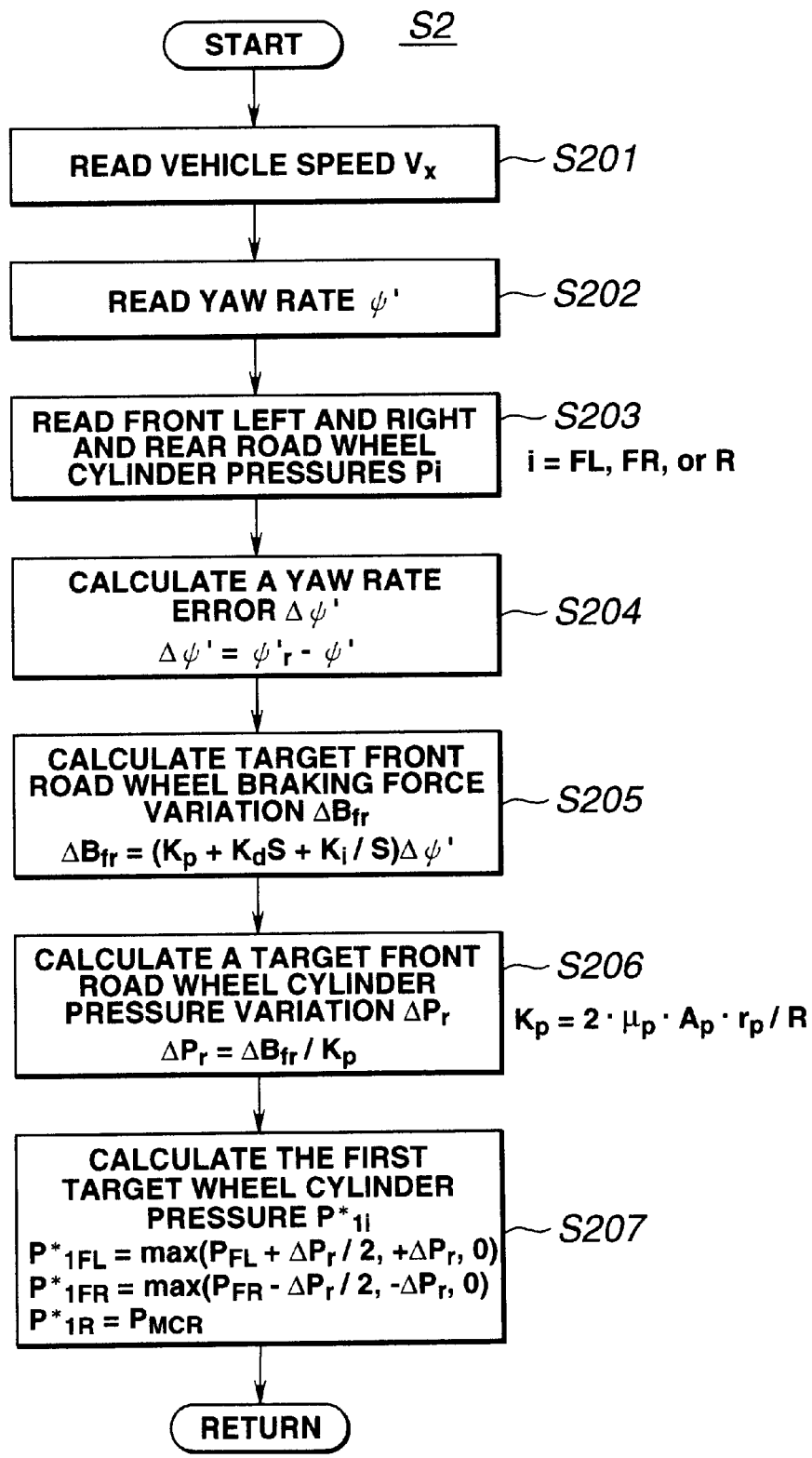

At the subsequent step S2, the CPU 19c of the controller 16 calculates a first target wheel cylinder pressure as will be described later with reference to FIG. 8.

At the subsequent step S3, the CPU 19c of the controller 16 calculates a second target wheel cylinder pressure as will be described later with reference to FIG. 9.

At the subsequent step S4, the CPU 19c of the controller 16 sets a braking force control suspension lag as will be described later with reference to FIG. 10.

At the subsequent step S5, the CPU 19c of the controller 16 calculates a target wheel cylinder pressure as will be described later with reference to FIG. 11.

At the subsequent step S6, the CPU 19c of the controller 16 generates and outputs a front road wheel side control signal as will be described later with reference to FIGS. 12A and 12B.

Figure 13A:
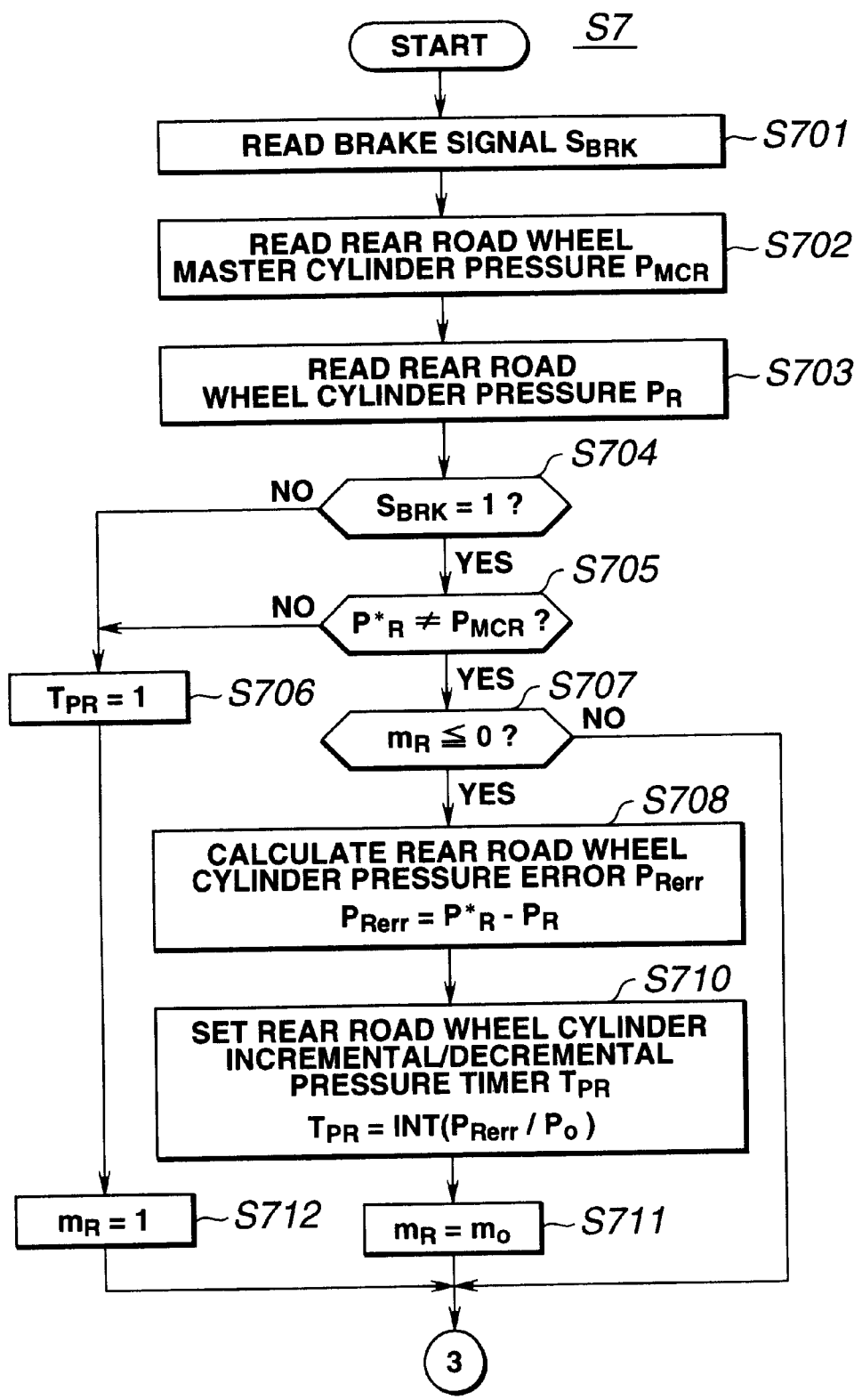

At the subsequent step S7, the CPU 19c of the controller 16 generates and outputs a rear road wheel side control signal as will be described later with reference to FIGS. 13A and 13B.

Then, the interrupt routine of FIG. 6 is returned to a main program routine.

Next, a calculation processing of FIG. 7 executed in the step S1 will be described below.

Figure 7:
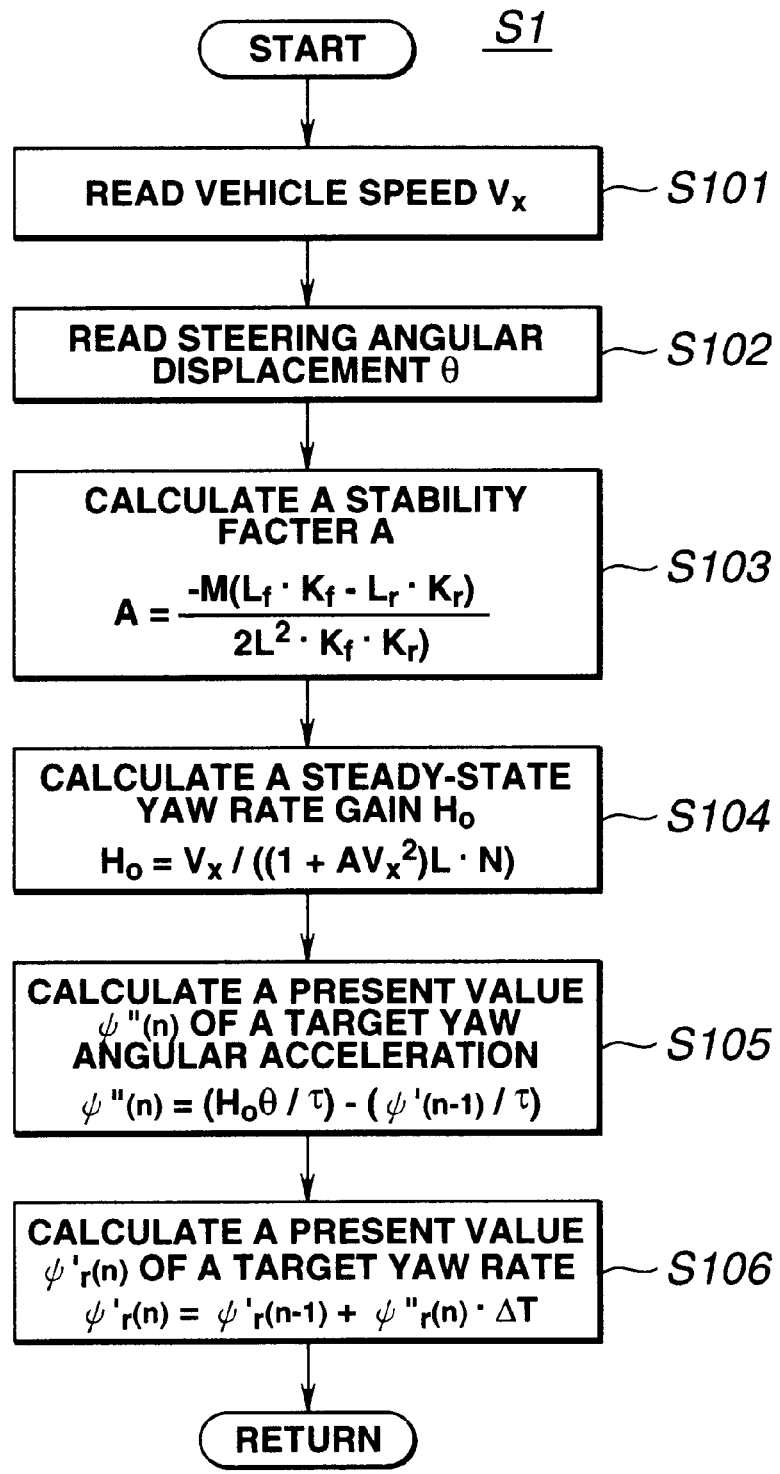
FIGS. 7, 8, 9, 10, 11, 12A, 12B, 13A, and 13B are detailed flowcharts for explaining respectively corresponding steps of the flowchart shown in FIG. 6.

In FIG. 7, at a step S101, the CPU 19c of the controller 16 reads the vehicle speed Vx from the vehicle speed sensor 12.

At the subsequent step S102, the CPU 19c of the controller 16 reads the steering angular displacement θ from the steering angle sensor 11.

At the subsequent step S103, the CPU 19c of the controller 16 calculates a stability factor A in accordance with the following equation (12).

$$A = -M(Lf \cdot Kf - Lr \cdot Kr)/2 \cdot L^2 \cdot Kf \cdot Kr \quad (12).$$

It is noted that since the stability factor A gives a constant value according to a vehicular characteristic of the controlled vehicle if front and rear road wheel cornering powers Kf and Kr are, in principle, constant, the previously calculated stability factor A may be stored in the ROM of the memory unit MEM 19d.

It is also noted that, in the equation (12), M denotes a vehicular weight, Lf denotes a distance between a vehicular weight center and a front road wheel axle, Lf denotes a distance between the vehicular weight center and a rear road wheel axle, Kf denotes a front road wheel cornering power, Kr denotes a rear road wheel cornering power, and L denotes a wheel base (L=Lf+Lr).

It is noted that Cr in FIG. 5 is Kr, Cf in FIG. 5 is Kf, Vy in FIG. 5 denotes a lateral speed, Tf denotes a front road wheel axle length.

At the subsequent step S104, the CPU 19c of the controller 16 calculates a steady state yaw rate gain Ho using the vehicle speed Vx and the stability factor A in accordance with the following equation.

$$Ho = Vx / \{(1 + A \cdot Vx^2) L \cdot N\} \quad (11)$$

In the equation (11), N denotes a steering gear ratio.

At the subsequent step S104, the CPU 19c of the controller 16 calculates a differential value of the target yaw rate, namely, a present value ψ"r(n) of a target yaw angular acceleration using the steady state yaw rate gain Ho and the steering angular displacement θ in accordance with the following equation (13).

$$\psi''r(n) = (Ho \cdot \theta / \tau) - (\psi'r(n-1)/\tau) \quad (13)$$

At the subsequent step S106, the CPU 19c of the controller 16 uses the present value ψ"r(n) of the target yaw angular acceleration to calculate the present value ψ'r(n) of the target yaw rate in accordance with the following equation (24) and the routine goes to the step S2.

$$\psi'(n) = \psi'r(n-1) + \psi''r(n) \cdot \Delta T \quad (24)$$

In the equation (24), ΔT denotes a predetermined sampling time and (n−1) denotes a previous value.

Next, a calculation processing of FIG. 8 executed at the step S2 of FIG. 6 will be described below.

At a step S201, the CPU 19c of the controller 16 reads the actual yaw rate ψ' from the yaw rate sensor 6. It is noted that ψ'=dψ/dt and ψ"=d²ψ/dt²=dψ'/dt.

At a step S203, the CPU 19c of the controller 16 reads front and rear road wheel side wheel cylinder pressures Pi (i=FL, FR, or R) from the pressure responsive sensors 14FL, 14FR, and 14R.

At a step S204, the CPU 19c of the controller 16 calculates a yaw rate error Δψ' by subtracting the actual yaw rate ψ'r from the target yaw rate ψ'r.

At the subsequent step S205, the CPU 19c of the controller 16 uses the yaw rate error ψ' to calculate a target front road wheel side braking force variation rate ΔBfr in accordance with the following equation (10).

$$\Delta Bfr = (Kp + Kd \cdot S + Ki/S) \cdot \Delta \psi' \quad (10).$$

It is noted that Kp denotes a proportional gain, Kd denotes a differential gain, Ki denotes an integration gain, S denotes a Laplace transform operator, in the equation (10). Refer to an available classical control theory from a method of setting each gain.

Next, at a step S206, the CPU 19c of the controller 16 uses the target front road wheel side braking force variation rate ΔPr in accordance with the following equation.

$$\Delta Pr = \Delta Bfr/Kp \tag{19}$$

It is noted that Kp denotes a proportional constant between each wheel cylinder pressure Pi and the braking force and is given as $$Kp = 2 \cdot \mu p \cdot A_p \cdot r_p / R \tag{18}.$$

In the equation (18), $\mu p$ denotes a frictional coefficient between a brake pad and a disc rotor, AP denotes a wheel cylinder area, $r_p$ denotes an effective radius of the disc rotor, and R denotes a tire radius.

Next, at a step S207, the CPU 19c of the controller 16 uses the target front road wheel cylinder pressure variation rate $\Delta Pr$ to calculate the first target wheel cylinder pressure P*1i of each wheel cylinder 1FL, 1FR, 1RL, and 1RR in accordance with the following equations (20) to (22). Then, the routine goes to the step S3 shown in FIG. 6.

$$P^*1_{FL} = \max[P_{FL} + \Delta Pr/2, +\Delta Pr, 0] \tag{20}$$

$$P^*1_{FR} = \max[P_{FR} - \Delta Pr/2, -\Delta Pr, 0] \tag{21}, \text{ and}$$

$$P^*1_R = P_{MCR} \tag{22}.$$

It is noted that max[A, B, C] denotes a selection of a maximum value from among A, B, and C and a total of the front left and right road wheel side first target wheel cylinder pressures $P^*1_{FL}$ and $P^*1_{FR}$ derived by the equations (20) and (21) is twice larger than the front road wheel side master cylinder pressure $P_{MCF}$ so that the total of the braking force is not varied from the start of control.

Next, a calculation processing of the steps S3 will be described below with reference to FIG. 9.

Figure 9:
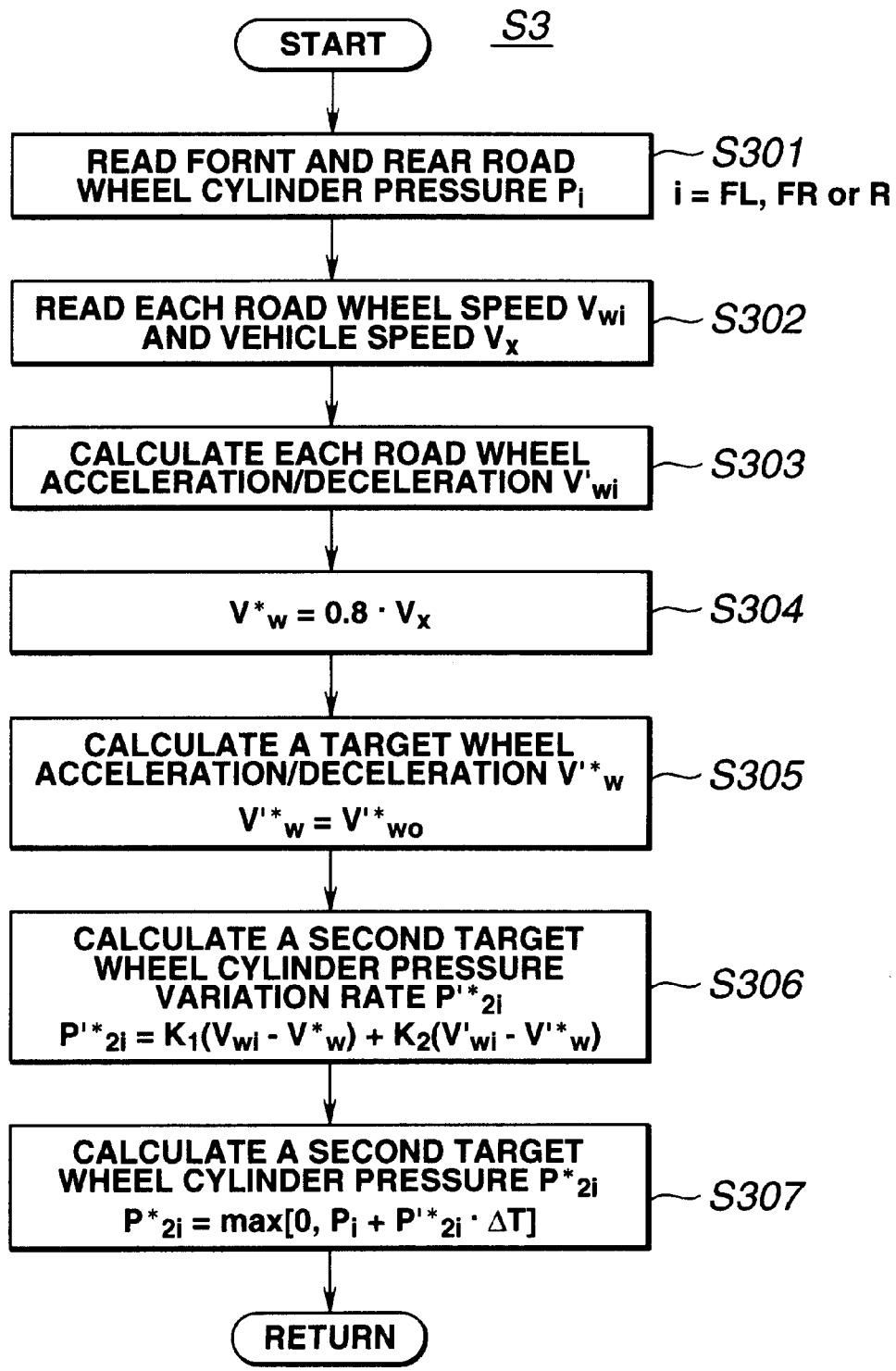

In FIG. 9, at a step S301, the CPU 19c of the controller 16 reads the front road wheel side wheel cylinder pressure Pi from the pressure responsive sensors 14FL, 14FR, and 14R.

At a step S302, the CPU 19c of the controller 16 reads the vehicle speed Vx from the vehicle speed sensor 12 and respective road wheel speeds Vwi from the respective road wheel speed sensors 17FL, 17FR, and 17R.

At the subsequent step S303, the CPU 19c of the controller 16 calculates respective road wheel accelerations/decelerations V'wi from differentiations of the corresponding read wheel speeds Vwi. To derive V'wi, a variation between the present and previous values of each road wheel speed Vwi may be divided by the predetermined sampling time $\Delta T$ or by a high pass filter having a particular phase advance.

At a step S304, the CPU 19c of the controller 16 calculates a target road wheel speed V*w to give a 20% slip rate of each road wheel speed with respect to a vehicle body speed using the vehicle speed Vx.

$$V^*w = 0.8 \cdot Vx \tag{27}$$

Next, at the step S305, the CPU 19c of the controller 16 defines a target road wheel deceleration V'*w as the target value of the road wheel acceleration/deceleration V'wi in accordance with the following equation (28).

$$V'^*w = V'^*w_0 \tag{28}$$

It is noted that $V'^*w_0$ denotes a predetermined value.

Next, at the step S306, the CPU 19c of the controller 16 calculates the second target wheel cylinder pressure variation rate P'*2i in accordance with equations (29) to (31) which accord with a, so-called, proportional-differential control method using the road wheel speed Vwi and the road wheel acceleration/deceleration V'wi.

$$P'^*2_{FL} = K_1 \cdot (V_{WFL} - V^*_W) + K_2 \cdot (V'_{WFL} - V'^*_W) \tag{29},$$

$$P'^*2_{FR} = K_1 \cdot (V_{WFR} - V^*_W) + K_2 \cdot (V'_{WFR} - V'^*_W) \tag{30}$$

$$P'^*2_R = K_1 \cdot (V_{WR} - V^*_W) + K_2 \cdot (V'_{WR} - V'^*_W) \tag{31}$$

It is noted that $K_1$ and $K_2$ denote proportional gain and differential gain, each having a predetermined value determined according to vehicular specifications.

Next, the routine goes to a step S307 in which the CPU 19c of the controller 16 calculates each second target wheel cylinder pressure P*2i in accordance with the following equation (32) using the calculated second target wheel cylinder pressure variation rate P'*2i and each wheel cylinder pressure Pi.

$$P^*2i = \max[0, Pi + P'2i \cdot \Delta T] \tag{32}$$

Next, the calculation processing of FIG. 10 executed at the step S4 of FIG. 6 will be described below.

Figure 10:
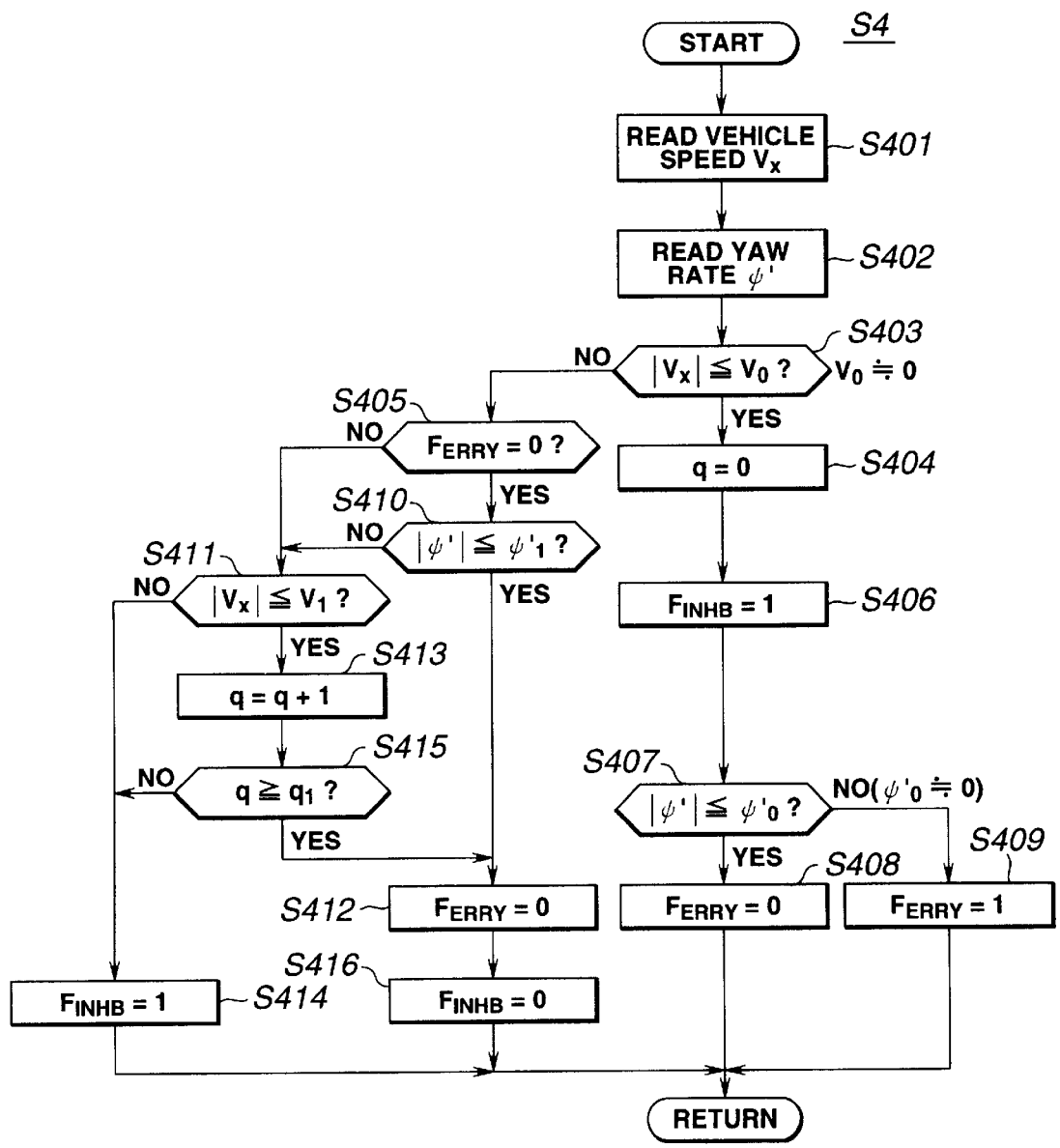

At a step 401 of FIG. 10, the CPU 19c of the controller 16 reads the vehicle speed Vx from the vehicle speed sensor 12. At the step S402, the CPU 19c of the controller 16 reads the actual yaw rate $\psi'$ from the yaw rate sensor 6.

At the subsequent step S403, the CPU 19c of the controller 16 determines if an absolute value of the vehicle speed (it is noted that the speed used in the present specification has the same meaning as a velocity) |Vx| is equal to or below a previously set minute predetermined value $V_0 (\approx 0)$. If $|Vx| \leq V_0$ (Yes) at the step S403, the routine goes to a step S404. If $|Vx| > V_0$ (No) at the step S403, the routine goes to a step S405.

At the step S404, the CPU 19c of the controller 16 clears a running counter q to "0" and the routine goes to a step S406 in which a feedback control inhibit (also called, suspension) flag $F_{INHB}$ is set to "1" and the routine goes to a step S407 in which the CPU 19c of the controller 16 determined whether an absolute value $|\psi'|$ of the yaw rate is equal to or below a previously set minute predetermined value $\psi'_0 (\approx 0)$ or not.

If The CPU 19c of the controller 16 determines that the absolute value $|\psi'51$ of the yaw rate is equal to or below the minute predetermined value $\psi'_0 (\approx 0)$ (,i. e., $|\psi'| \leq \psi'_0$) at the step S407 (YES), the routine goes to a step S408.

On the other hand, if $|\psi'''| > \psi'_0$ (No) at the step S407, the routine goes to a step S409 in which the external disturbance flag $F_{ERRY}$ is set to "1".

Figure 11:
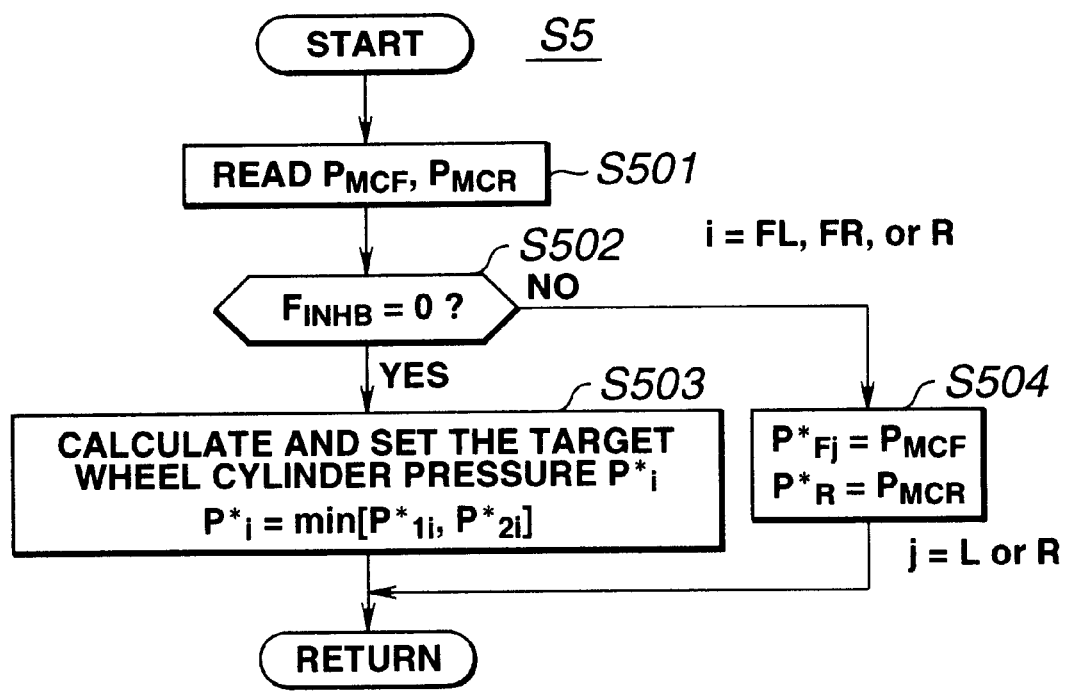

At the step S408, the CPU 19c of the controller 16 resets an external disturbance input flag $F_{ERRY}$ to "0" and the routine goes to the step S5 of FIG. 11.

On the other hand, if |Vx|>V0 at the step S403, the routine goes to the step S405 in which the CPU 19c of the controller 16 determines if the disturbance input flag $F_{ERRY}$ is set to "0".

If the disturbance input flag $F_{ERRY}$ is set to "1" (Yes) at the step S405, the routine goes to a step S410. If $F_{FERRY}$ is set to "1" (NO) at the step S405, the routine goes to a step S411.

At the step S410, the CPU 19c of the controller 19 determines whether an absolute value $|\psi'|$ of the yaw rate is equal to or below a previously set predetermined value $\psi'_1$ $(>\psi'_0)$ or not.

If the absolute value $|\psi'|$ of the yaw rate is equal to or below a predetermined value $\psi'_1$ $(>\psi'_0)$ at the step S410 (YES), the routine goes to a step S412.

If No at the step S410 ($|\psi'|>\psi'_1$) the routine goes to a step S411.

At the step S411, the CPU 19c of the controller 16 determines if an absolute value |Vx| of the vehicle speed is equal to or above a predetermined value $V_1(>V_0)$. If $|Vx| \leq V_1(>V_0)$ at the step S411 (Yes), the routine goes to a step S413.

At the step S413, the running counter q is incremented by one (q=q+1) and the routine goes to a step S415 in which the CPU 19c of the controller 16 determines if the value of the running counter q is equal to or above a previously set predetermined value $q_1$. If the counted value of the running counter q is equal to or above a predetermined value q1 (Yes) at the step S415, the routine goes to the step S412. If No at the step S415 (q<$q_1$), the routine goes to the step S414 in which the feedback control inhibit flag $F_{INHB}$ is set to "1".

At the step S412, the CPU 19c of the controller 16 resets the disturbance input flag $F_{ERRY}$ to "0".

At the next step S416, the CPU 19c of the controller resets the feedback control inhibit flag $F_{INHB}$ to "0".

Thereafter, the routine goes to the step S5 of the calculation processing of FIG. 6.

Next, the calculation processing executed at the step S5 of FIG. 6 will be described below with reference to FIG. 11.

That is to say, at the first step of S501, the CPU 19c of the controller 16 reads the first and rear road wheel master cylinder pressures $P_{MCF}$ and $P_{MCR}$ from the pressure responsive sensors $14_{MCF}$ and $14_{MCR}$.

Next, the routine goes to a step S502.

At the step S502, the CPU 19c of the controller 16 determines whether the feedback control suspension (inhibit) flag $F_{INHB}$ is reset to "0".

If Yes ($F_{INHB}$="0") at the step S502, the routine goes to a step S503.

If No at the step S502 ($F_{INHB}$="1"), the routine goes to a step S504.

At the step S503, the CPU 19c of the controller 16 calculates and sets the target wheel cylinder pressure P*i in accordance with the equation (33) and the routine goes to the step S6 of FIG. 6.

$$P*i = \min[P*1i, P*2i] \quad (30)$$

It is noted that min (A, B) denotes a selection of a minimum value from among A and B.

At the step S504, the front left and right road wheel side target cylinder pressures $P*_{Fj}$ (j=L or R) are set to the front road wheel side master cylinder pressure $P_{MCF}$ and the rear road wheel side target wheel cylinder pressure $P*_R$ is set to the rear road wheel side master cylinder pressure $P_{MCR}$ ($P*Fj=P_{MCF}$, $P*R=P_{MCR}$, j=L or R).

Then, the routine goes to the step S6 of the calculation processing of FIG. 6.

Next, the calculation processing executed at the step S6 will be described below with reference to FIGS. 12A and 12B.

At the step S601, the CPU 19c of the controller 16 reads the brake signal $S_{BRK}$ from the brake switch 13.

At the step S602, the CPU 19c of the controller 16 reads the front wheel master cylinder $P_{MCF}$ from the pressure responsive sensor $14_{MCF}$. At the step S603, the CPU 19c of the controller 16 reads each of the front left and right road wheel cylinder pressures $P_{Fj}$ from the corresponding pressure responsive sensors 14FL and 14FR.

At the step S604, the CPU 19c of the controller 16 determines if the brake signal $S_{BRK}$ is turned to ON (namely, to a logic level of "1").

If (No) at the step S605 ($P*_{FJ}=P_{MCF}$), the routine goes to a step S606.

At the step S605, the CPU 19c of the controller 16 determines if the respective front left and right road wheel target wheel cylinder pressures $P*_{Fj}$ are different from the front road wheel side master cylinder pressure $P_{MCF}$ ($P*_{Fj} \neq P_{MCF}$) If both wheel cylinder pressures $P*_{Fj}$ are different from each other (Yes) at the step S605, the routine goes to a step S607. If (NO) at the step S607 ($P*_{Fj}=P_{MCF}$), the routine goes to a step S606.

At the step S607, the CPU 19c of the controller 16 determines if a control continuation timer $m_{Fj}$ is equal to or below "0". If the control continuation timer $m_{Fj}$ is equal to or below "0" at the step S607 (YES), the routine goes to a step S608.

If (NO) at the step S607 ($M_{Fj}>0$), the routine goes to a step S609.

At the step S608, the CPU 19c of the controller 16 calculates an error $P_{Fjerr}$ (=$P*_{Fj}-P_{Fj}$) between the front left and right road wheel target wheel cylinder pressures $P*_{Fj}$ and the corresponding wheel cylinder pressures $P_{Fj}$ and the routine goes to a step S610.

At the step S610, the CPU 19c of the controller 16 calculates the front left and right road wheel cylinder pressure incremental/decremental pressure timers $T_{PFj}$ (j=L or R) between the front left and right road wheels in accordance with the following equation (41) in which a value of the error $P_{Fjerr}$ divided by a reference value Po is half adjusted (or round off).

At the subsequent step S611, the CPU 19c of the controller 16 sets a previously set positive predetermined value $m_0$ to the control continuation timer $m_{Fj}$ and the routine goes to the step S609.

At the step S609, the CPU 19c of the controller 16 determines if the respective target wheel cylinder pressures $P*_{Fj}$ of the front left and right road wheels are equal to or below the front road wheel side master cylinder pressure $P_{MCF}$.

If $P*_{Fj} \leq P_{MCF}$ at the step S609 (YES), the routine goes to a step S612. If (NO) at the step S609 ($P*_{Fj}>P_{MCF}$), the routine goes to a step S613.

In addition, at the step S606, the front left and right road wheel cylinder pressure increment/decrement pressure timer $T_{PFj}$, are set to "1" and the routine goes to a step S614. After the above-described control continuation timer $m_{Fj}$ is set to "1" and the routine goes to the step S612 of FIG. 12B.

If, at the step S609, $P*_{Fj}>P_{MCF}$ (NO), the routine goes to a step S613.

Thereafter, the routine goes to a step S614 in which the control continuation timer $m_{Fj}$ is set to "1" and the routine goes to the step S612.

At the step S612, the CPU 19c of the controller 16 commands to output a pressure decrement (pressure decrease) signal to each of the front left and right road wheel side TCS switching valves 22FL and 22FR. Then, the routine goes to a step S615A.

At the step S615A, the CPU 19c of the controller 16 determines if $T_{PFj}=0$ or $\neq 0$.

If $T_{PFj}=0$ (YES) at the step S615A, the routine goes to a step S617.

If $T_{PFj} \neq 0$ (NO) at the step S615A, the routine goes to a step S615B.

At the step S615B, the CPU 19c of the controller 16 determines if $T_{PFj}>0$ or <0.

If $T_{PFj}>0$ at the step S615B (YES), the routine goes to a step S616. If $T_{PFj}<0$ at the step S615B (NO), the routine goes to a step S618.

Then, at the step S616, the CPU 19c of the controller 16 commands to output the pressure increment (increase) signal to the corresponding one of the front left and right road wheel side TCS switching valves 22FL and 22FR.

Then, the routine goes to a step S619.

At the step S619, the CPU 19c of the controller 16 decrements the wheel cylinder pressure increment/decrement pressure timer ($T_{PFj}=T_{PFj}-1$) and the routine goes to a step S620.

On the other hand, at the step S617, the CPU 19c of the controller 16 commands to output a hold signal to either one of the front left and right road wheel ABS switching valves 3FL or 3FR. Then, the routine goes to the step S620.

Furthermore, at the step S618, the CPU 19c of the controller. 16 commands to output a pressure decrement signal to the corresponding one of the front left and right road wheel ABS switching valves 3FL or 3FR. Then, the routine goes to a step S621 in which the wheel cylinder pressure increment/decrement pressure timer $T_{PFj}$ is incremented by one as $T_{PFj}=T_{PFj}+1$ and the routine goes to the step S620 (mFj=mFj−1).

Figure 12A:
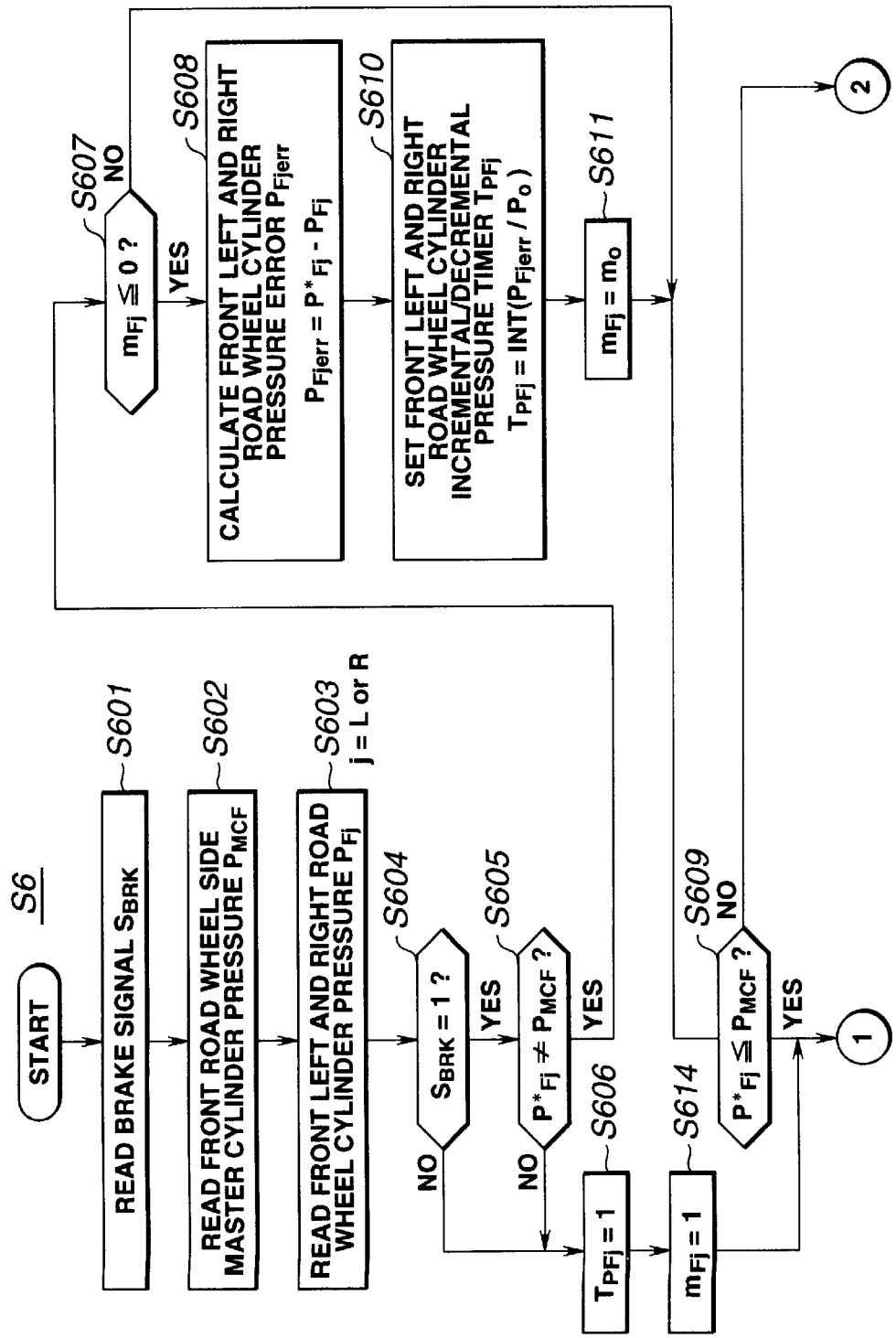
Figure 12B:
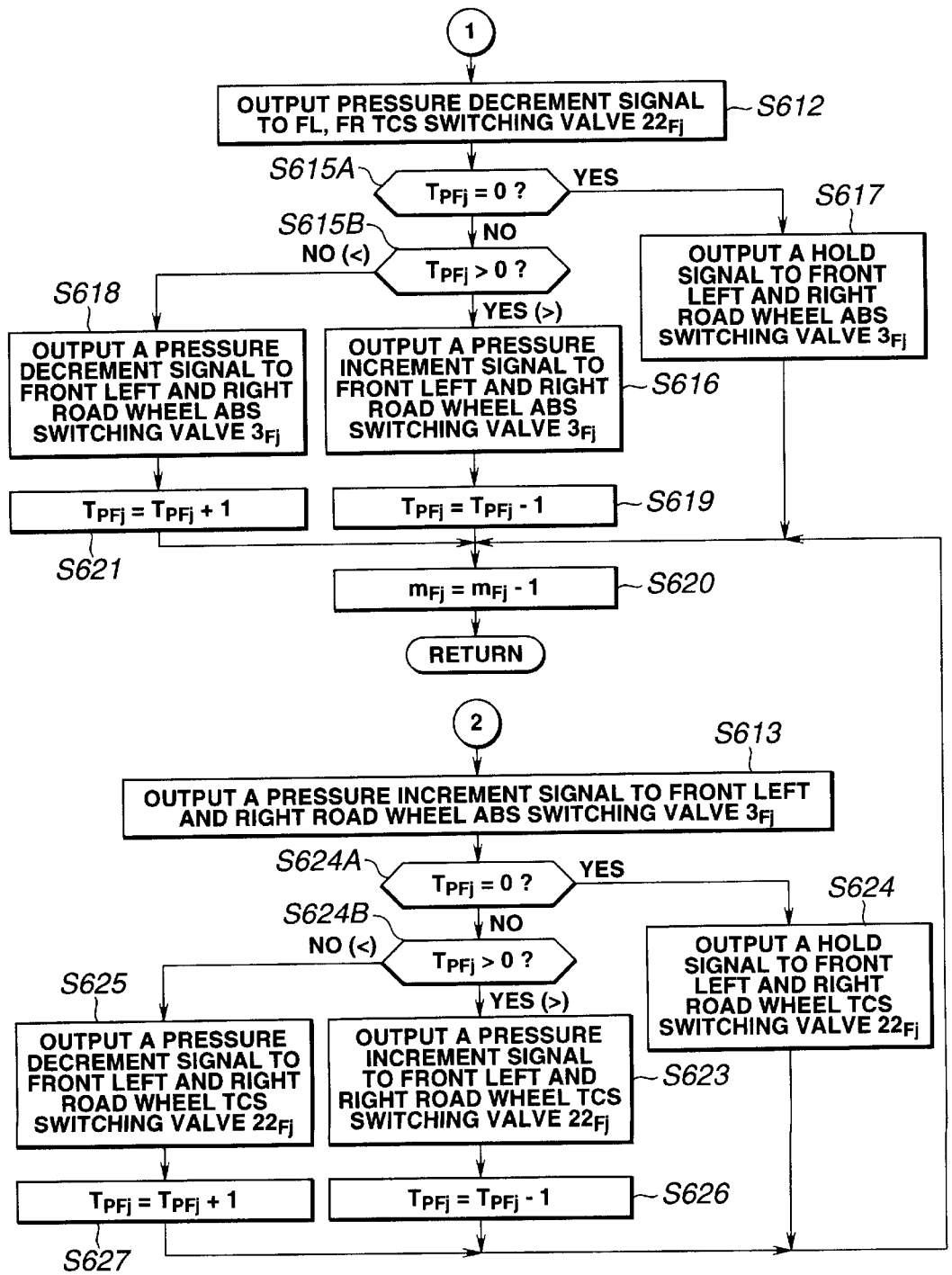
Figure 13B:
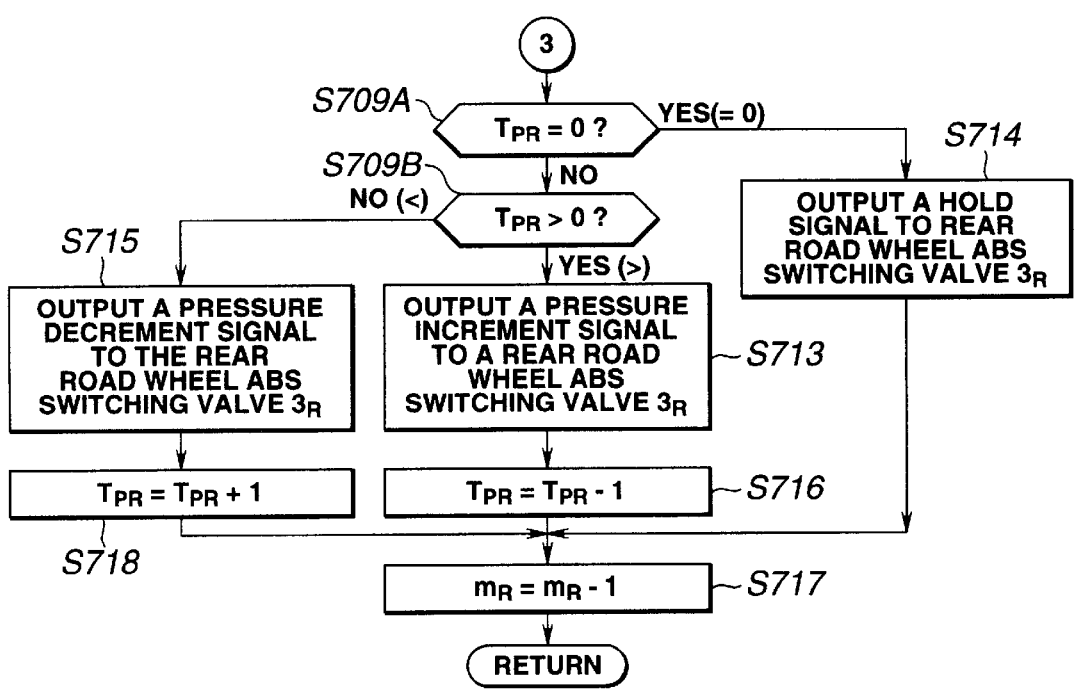

On the other hand, at the step S613 of FIG. 13B incoming from the step S609 of FIG. 12A, the CPU 19c of the controller 16 commands to output the pressure increment signal to the corresponding one of the front left and right road wheel side ABS switching valves 3FL or 3FR.

Then, the routine goes to a step S624A in which the CPU 19c of the controller 16 determines whether the timer $T_{PFj}=0$ or ≠0. If $T_{PFj}=0$ (YES) at the step S624A, the routine goes to a step S624. If $T_{PFj}\neq 0$ (NO) at the step S624A, the routine goes to a step S624B. At the step S624B, the CPU 19c of the controller 16 determines if $T_{PFj}>0$ or <0. If $T_{PFj}>0$ (YES) at the step S624B, the routine goes to a step S623. If $T_{PFj}<0$ (NO) at the step S624B, the routine goes to a step S625.

At the step S623, the CPU 19c of the controller 16 outputs the pressure increment signal to the corresponding one of the front left and right road wheel TCS switching valves 22FL or 22FR. Then, the routine goes to a step S626.

At the step S626, the CPU 19c of the controller 16 decrements the wheel cylinder pressure increment/decrement pressure timer $T_{PFj}$ by one ($T_{PFj}=T_{PFj}-1$).

At the step S624, the CPU 19c of the controller 16 decrements the wheel cylinder pressure increment/decrement pressure timer $T_{PFj}$ by one ($T_{PFj}=T_{PFj}-1$) and the routine goes to the step S620.

Furthermore, at the step S625, the CPU 19c of the controller 16 commands to output the pressure decrement signal to the corresponding one of the front left and right TCS switching valves 22FL or 22FR (22Fj).

Then, the routine goes to a step S627 in which $T_{PFj}=T_{PFj}+1$. The routine is returned to the step S620.

At the step S620, the control continuation timer mFj is decremented by one and the routine goes to the step S7 shown in FIG. 6.

Next, the calculation processing shown in FIGS. 13A and 13B and executed at the step S7 of FIG. 6 will be described below.

First, at the first step S701, the CPU 19c of the controller 16 reads the brake signal $S_{BRK}$ from the brake switch 13.

Next, at a step S702, the CPU 19c of the controller 16 reads the rear road wheel side master cylinder pressure $P_{MCR}$ from the corresponding pressure responsive sensor 14MCF.

Next, at the subsequent step S703, the CPU 19c of the controller 16 reads the rear road wheel cylinder pressure $P_R$ from the pressure responsive sensor 14R.

Next, at a step S704, the CPU 19c of the controller 16 determines if the read brake signal $S_{BRK}$ is turned to the logical value of "1" (ON state).

If the read brake signal $S_{BRK}$ is at the "1" (YES) at the step S704, the routine goes to a step S706.

If $S_{BRK}$ is at the "0" (NO) at the step S704, the routine goes to a step S706.

At the step S705, the CPU 19c of the controller 16 determines whether the rear road wheel side target wheel cylinder pressure $P^*_R$ is different from the rear road wheel master cylinder pressure $P_{MCR}$ ($P^*_R\neq P_{MCR}$) If both are different (YES) at the step S705 ($P^*_R\neq P_{MCR}$), the routine goes to a step S707 in which the CPU 19c of the controller 16 determines whether the control continuation timer $m_R$ is equal to or below "0".

If YES at the step S707 ($m_R\leq 0$), the routine goes to a step S708.

If NO at the step S707 ($m_R>0$), the routine goes to a step S709A.

At a step S710, the CPU 19c of the controller 16 calculates an error Prerr (=$P^*_R-P_R$) between the rear road wheel target wheel cylinder pressure $P^*_R$ and the corresponding wheel cylinder pressure $P_R$. Then, the routine goes to a step S710.

At the step S710, the CPU 19c of the controller 16 calculates a rear road wheel cylinder pressure increment/decrement pressure timer $T_{PR}$ in accordance with the following equation (42) in which a value of the error $P_{RERR}$ divided by a reference value Po is rounded (half adjusted) and the routine goes to a step S711 in which a previously set positive predetermined value mo is set to the control continuation timer $m_R$ ($m_R$=mo) and the routine goes to the step S709.

$$T_{PR}=INT(P_{Rerr}/Po) \qquad (42).$$

At the step S706, the CPU 19c of the controller 16 sets a rear road wheel cylinder pressure increment/decrement timer $T_{PR}$ to "1". Thereafter, the routine goes to a step S712.

Next, after the control continuation timer $m_R$ is set to "1" at the step S712 ($m_R=1$), the routine goes to the step 709A of FIG. 13B.

At the step 709A, the CPU 19c of the controller 16 determines whether the wheel cylinder pressure increment/decrement timer indicates zero or not ($T_{PR}=0$). If YES at the step S709A, the routine goes to a step S714. If NO at the step S709A ($T_{PR}\neq 0$), the routine goes to a step S709B.

At the step S709A, the CPU 19c of the controller 16 determines whether the timer $T_{PR}$ indicates positive or negative. If YES at the step S709B ($T_{PR}>0$), the routine goes to a step S713. If NO at the step S709B ($T_{PR}<0$), the routine goes to a step S715.

At the step S714, the CPU 19c of the controller 16 commands to output the hold signal to the rear road wheel ABS switching valve 3R.

On the other hand, at the step S713, the CPU 19c commands to output the pressure increment signal to the rear road wheel side ABS switching valve 3R and the routine goes to a step S716.

At the step S716, the CPU 19c of the controller 16 decrements the rear road wheel cylinder pressure increment/decrement timer $T_{PR}$ is decremented by one ($T_{PR}=T_{PR}-1$) and the routine goes to a step S717 ($m_R=m_R-1$).

Furthermore, at the step S715, the CPU 19c of the controller 16 commands to output the pressure decrement signal to the rear road wheel ABS switching valve 3R and the routine goes to a step S718 in which $T_{PR}=T_{PR}+1$.

Thereafter, the routine goes to the step S717.

As described above, at the step S717, the following substitution is carried out: ($m_R=m_R-1$).

Then, the routine returns to the main program routine.

Next, an operation of the embodiment of the yawing motion variable controlling apparatus applicable to the braking force controlling apparatus for the vehicle will be described below with reference to FIGS. 1 through 13B.

It is noted that if, in the calculation processing of FIG. 10 executed at the step S4 of the calculation processing of FIG. 6, the feedback control suspension (or inhibit) flag $F_{INHB}$ is not set to "1", the CPU 19c of the controller sets either one of the first target wheel cylinder pressure P*i or second target wheel cylinder pressure P*2i which is smaller than the other as the target wheel cylinder pressure P*i, at the calculation processing of FIG. 11 executed at the step S5.

It is noted that when the feedback control inhibit flag $F_{INHB}$ is set at the step S4 (the steps S414 and S406 of FIG. 10), the front road wheel side target wheel cylinder pressure $P*_{Fj}$ is set to $P_{MCF}$ and the rear road wheel side target wheel cylinder pressure P*R is set to the $P_{MCR}$ as in the step S504.

The yawing motion, in this case, that is to say, a result of yaw rate control is disclosed in a U.S. Pat. No. 5,344,224, (the disclosure of which is herein incorporated by reference) except the difference in that the actual yaw rate is measured (in the case of the embodiment) or estimated (in the case of the above-identified U.S. patent).

Hence, the brief description of the result of the yaw rate control will be made.

That is to say, suppose, for example, that, during the braking, the steering wheel 10 is steered in a leftward direction from a straight running state (generally, a neutral position) so that the vehicle is in a left turn (refer also to FIG. 5).

The steering angular displacement θ according to the steering wheel 10 is outputted from the steering angle sensor 11.

At this time, the differential value of the calculated target yaw rate, i.e., the present value ψ"r(n) of the yaw angular acceleration ψ"r(n) gives a value which accords with the steady-state yaw rate gain Ho, the steering angular displacement θ, the gain Ho and the steering angular displacement θ being accorded with the differential value of the calculated target yaw rate, i.e., (the present value) of the yaw angular acceleration ψ"r(n).

Consequently, the present value of the target yaw rate ψ'r(n) is also increased.

Hence, the target front road wheel braking force vibration rate ΔBfr which accords with the error Δψ' between the target yaw rate ψ'r and the actually measured yaw rate ψ' is calculated.

The target front road wheel cylinder variation rate ΔPr is calculated to achieve the target front road wheel braking force variation rate ΔBfr.

The first target wheel cylinder pressure $P*1_{FL}$ of the front left road wheel is set to any one of larger values from among ($P_{MCF}$+ΔPr/2), +ΔPr, or "0". It is noted that the first target wheel cylinder pressure $P*1_R$ is set to the rear road wheel master cylinder pressure $P_{MCR}$.

On the other hand, in the same way as the previously proposed ABS control, the second target wheel cylinder pressure variation rate P'*2i which satisfies the predetermined slip rate is calculated.

An integration value of the second target wheel cylinder variation rate P'2i* is added to the present wheel cylinder pressure Pi and the second target wheel cylinder pressure P*2i is calculated and set.

Then, either one of the first target wheel cylinder pressure P*2i or second target wheel cylinder pressure P*2i which is smaller than the other is set finally to the target wheel cylinder pressure P*i.

When the target wheel cylinder pressure P*i is set, in the case of, for example, the front left or right road wheel cylinder pressure $P_{Fj}$ (j=L or R), the pressure increment/decrement timer $T_{PFj}$ is finally set to a target wheel cylinder pressure P*i.

When the target wheel cylinder pressure P*i is set, in the case of, for example, the front left or right road wheel cylinder pressure $P_{Fj}$ (j=L or R), the pressure increment/ decrement timer $T_{PFj}$ which accords with the wheel cylinder pressure error $P_{Fjerr}$ at the time of the braking force control is set on a preposition that the target wheel cylinder pressure $P*_{Fj}$ is not coincident with the front road wheel master cylinder pressure $P_{MCF}$ and the control continuation timer mFj is set to a predetermined value mo.

If the target wheel cylinder pressure $P*_{Fj}$ is equal to or below the front road wheel master cylinder pressure PMCF, the pressure decrement signal is outputted from the controller 16 to the TCS switching valves 22FL and 22FR to control the front left or right road wheel cylinder pressure PFj to be equal to or above the first road wheel master cylinder pressure $P_{MCF}$. Each wheel cylinder 1FL or 1FR is uninterruptedly connected to the ABS actuator.

Thereafter, the pressure increment/decrement timer $T_{PFj}$ is equal to or below "0". Until the wheel cylinder pressure error $P_{Fjerr}$ is corrected, the pressure increment/decrement or the hold signal is continued to be outputted to the ABS switching valve 3FL or 3FR.

In addition, if the target wheel cylinder pressure $P*_{Fi}$ is larger than the first road wheel master cylinder pressure $P_{MCF}$, the pressure increment signal is outputted to the ABS switching valves 3FL and 3FR from the controller 16 to control the front left and right road wheel cylinder pressure $P_{Fj}$ to be in a region equal to or below the front road wheel master cylinder pressure $P_{MCF}$. Together with each wheel cylinder 1FL or 1FR uninterruptedly connected to the TCS actuator 15, the pressure increment/decrement timer $T_{PFj}$ is equal to or below "0".

Consequently, since the pressure increment/decrement timer $T_{PFj}$ is equal to or below "0", the increment/decrement pressure or the hold signal is continued to be outputted to the TCS switching valves 22FL and 22FR until the wheel cylinder pressure error $P_{Fjerr}$ is corrected.

Consequently, at the time when at least pressure increment/decrement timer $T_{PR}$ indicates "0", the rear road wheel side wheel cylinder pressure $P_R$ becomes coincident with or approximately coincident with the target wheel cylinder pressure $P*_R$.

It is noted that when the target wheel cylinder pressure P*R is coincident with the rear road wheel master cylinder pressure $P_{MCR}$ or when the brake pedal is not depressed, the ABS actuator 2 is always in the pressure increment state, each wheel cylinder 1FL and 1FR is uninterruptedly connected to the master cylinder 5.

Hence, for example, suppose when the vehicle is turned abruptly at a relatively low speed on a relatively high frictional coefficient μ road surface, the steering angular displacement θ is so large but the vehicle speed Vx is so small, thus the target yaw rate ψ'r being large. The front left and right road wheel first target wheel cylinder pressure $P*1_{Fj}$ set at least in the pressure decrement direction is smaller than the present wheel cylinder pressure $P_{Fj}$. In addition, since the road wheel tends to become lock tendency on such a high frictional road surface, each road wheel velocity Vwi becomes difficult to be smaller than the target road wheel velocity Vw*.

In addition, the road wheel acceleration/deceleration Vwi tends to becomes smaller than the target road wheel acceleration/deceleration V'w*.

Hence, the second target wheel cylinder pressure P*2i is set to be equal to or larger than the present wheel cylinder pressure Pi.

Hence, in such a case as described above, the first target wheel cylinder pressure P*1i is set to the target wheel cylinder pressure P*i.

Consequently, the braking force control such that the yaw rate is made coincident to the target value is carried out with a higher priority.

On the other hand, suppose, for example, that, as in such a case where the vehicle is turned on a relatively low frictional coefficient $\mu$ road surface at a relatively high vehicle speed, the steering angular displacement $\theta$ is relatively small (narrow) but the vehicle speed Vx is relatively high.

In this case, the first target wheel cylinder pressure P*i is set to be equal to or larger than the present wheel cylinder pressure Pi.

Since each road wheel tends to become a lock tendency on the low frictional coefficient road surface $\mu$, the road wheel velocity Vwi becomes smaller than the target road wheel velocity Vw*.

In addition, the road wheel acceleration/deceleration V'wi becomes smaller than the target road wheel acceleration/ deceleration V'w*. Consequently, the second target wheel cylinder pressure P*2i which is smaller than the present wheel cylinder pressure Pi is set.

Hence, in such a case as described above, the second target wheel cylinder pressure P*2i is set to the target wheel cylinder pressure P*i.

Consequently, the control recovering the road wheel velocity Vwi is carried out with a priority. It is noted that when the road wheel velocity Vwi is recovered and the cornering power approached to its set value, the braking force control to make the yaw rate coincident with the target value is carried out.

Next, the detailed explanation on the operation of the first embodiment from the time at which the vehicle has stopped to the time at which the vehicle is restarted will be made in details below.

Suppose that, during the braking force control during the steady-state running as described above, the calculation processing of FIG. 10 (step S4 in FIG. 6) is executed immediately after the vehicle has stopped. At this time, the running counter q is cleared to zero when the routine of FIG. 10 goes from the step S403 to the step S404. Next, at the step S406, the feedback control suspension (or inhibit) flag F$_{INHB}$ is set to "1".

It is noted that, if the absolute value |ψ'| of the yaw rate detected during the vehicular stopped state becomes larger than the minute predetermined value ψ'$_0$, the routine is transferred from the step S407 to the step S409 in which the disturbance input flag F$_{ERRY}$ is set to "1".

As described above, if the control suspension (or inhibit) flag F$_{INHB}$ is set to "1", the routine is transferred from the step S502 to the step S504 at the subsequent calculation processing of FIG. 11. As described above, irrespective of the values of the first target wheel cylinder pressure P*1i and the second target wheel cylinder pressure P*2i, the front and rear road wheel master cylinder pressures P$_{MCF}$ and P$_{MCR}$ are set to the target wheel cylinder pressures P*i for the front and the rear road wheel cylinder pressures P*i for the front and rear road wheel cylinder pressure P*i, as described above.

In addition, as described above, if the front and rear road wheel master cylinder pressures P$_{MCF}$ and P$_{MCR}$ are forcefully set to the target wheel cylinder pressure P*i, the ABS actuator 2 connected uninterruptedly to the respective wheel cylinders 1FL, 1FR, 1RL, and 1RR are all in the pressure increment states.

In fact, the braking force control is cancelled. That is to say, during the set state of the control suspension (inhibit) flag F$_{INHB}$, the control of the yawing motion such as the yaw rate is suspended (inhibited).

For example, suppose that the vehicle is forcefully turned to provide the yawing motion on the vehicle when the vehicle is stopped on a rotatable turn table having a generally circle shape of an upper surface on which the vehicle is mounted.

Such a turn table as described above is found in, for example, a vehicular parking apparatus. Accordingly, the yaw rate ψ' is spontaneously developed. However, since the vehicle is not steered, the steering angular displacement $\theta$ is not varied. Although the vehicle speed Vx indicates zero value, the target yaw rate ψ' is developed.

However, since the vehicle is not steered, the steering angular displacement $\theta$ is not varied. Since the vehicle speed Vx indicates zero, the target yaw rate ψ'r also indicates zero.

In this situation, even though the first target wheel cylinder pressure P*1i is set which accords with the error Δψ' between the target yaw rate ψ'r and the detected yaw rate ψ', the actual braking force control, namely, the yawing motion variable control is not performed and no unnecessary controlled variable such as a corrective yaw rate is outputted to the controlled object from the controller.

Thereafter, suppose a case where the vehicle is restarted from the turn table, the absolute value |Vx| of the vehicle speed is larger than the minute predetermined value V$_0$, the absolute value |ψ'| of the yaw rate detected during the parking is equal to or below the minute predetermined value ψ'$_0$, the disturbance input flag F$_{ERRY}$ is reset to "0" and the absolute value |ψ'| of the yaw rate is equal to or below the predetermined value ψ'$_1$. In this case, at the calculation processing of FIG. 10, the routine goes from the step S403 to the step S412 via the steps S405 and S410.

After the disturbance input flag F$_{ERRY}$ is again reset. In this way, if the feedback control suspension (or inhibit) flag F$_{INHB}$ is reset, the routine goes from the step S502 of the calculation processing of FIG. 11 to the step S503.

As described above, either one of the first target wheel cylinder pressure P*1i or the second target wheel cylinder pressure P*2i which is smaller than the other is set to the target wheel cylinder pressure P*i at the step S503. Again, the feedback control of the yaw rate, i.e., the yawing motion variable or the feedback control of the slip rate is restarted.

In addition, suppose that, after the vehicle is started, the absolute value |ψ'| of the yaw rate detected during the vehicle stop is larger than the minute predetermined value ψ'$_0$ and, consequently, the disturbance input flag F$_{ERRY}$ is set. In this case, the routine is transferred from the step S405 to the step S411 at the calculation processing of FIG. 10. Until the absolute value |Vx| of the vehicle speed is equal to or above the predetermined value V$_1$, the routine goes to a step S414 in which the feedback suspension (or inhibit) flag f$_{INHB}$ is set to continue to be cancelled. In this situations, although the vehicular start is recognized, the unnecessary controlled variable is not outputted against the disturbance of the yawing motion which is developed immediately after the vehicle has started. As the result of this, a vehicular motion can be stabilized.

However, in these cases, if the absolute value |Vx| of the vehicle speed is equal to or above the predetermined value V$_1$, the routine goes from the step S411 to the step S413 at the calculation processing of FIG. 10 in which the running counter q is incremented.

When the running counter q is below the predetermined value q$_1$, the routine goes to the step S414 in which the feedback control suspension (inhibit) flag F$_{INHB}$ is continued to be set. However, if the running counter q is equal to or above the predetermined value q$_1$, the routine goes from the step S412 to the step S416.

That is to say, suppose a case such that the forceful yawing motion is detected during the vehicle stop or the yawing motion to a certain degree or more not enough to be developed is detected. Even in this case, when the vehicle speed Vx is incremented to some degree, hence, a sufficient control of the yawing motion becomes possible, and, furthermore, a control time duration of the control over the yawing motion is continued for a predetermined duration, the feedback control suspension (or inhibit) flag $F_{INHB}$ is finally reset.

However, in these cases, if the absolute value |Vx| of the vehicle speed is equal to or above the predetermined value $V_1$, the routine goes from the step S411 to the step S413 at the calculation processing of FIG. 10 in which the running counter q is incremented.

When the running counter q is below the predetermined value $q_1$, the routine goes to the step S414 in which the feedback control suspension (inhibit) flag $F_{INHB}$ is continued to be set.

However, if the running counter q is equal to or above the predetermined value $q_1$, the routine goes from the step S412 to the step S416.

That is to say, suppose a case such that the forceful yawing motion is detected during the vehicle stop or the yawing motion to a certain degree or more not enough to be developed is detected.

Hence, immediately after the vehicle has started or during such a low speed run that a vehicular occupant does not demand a superior responsive characteristic on a turning around characteristic or turning convergence characteristic can avoid the output of the unnecessary controlled variable against the external disturbance of the yawing motion which cannot sufficiently control and can stabilize the resultant vehicular motion.

The yawing motion variable controlling apparatus is also applicable to the control over the braking force difference between the rear left and right road wheels, the front left and right road wheels, the front left and right road wheel pairs, or between the front left and rear left road wheels, and the front right and rear right road wheels.

Furthermore, the microcomputer described in the embodiment may be replaced with a combination of electronic circuits such as counters, A/D converter, D/A converter, and comparators.

The yawing motion variable may be $\psi$ (the integration of the yaw rate $\psi'$) or by $\psi''$ (the differential value of the yaw rate).

The yawing motion variable controlling apparatus according to the present invention is also applicable to a power assisted steering controlling apparatus including a four-wheel steering controlling apparatus disclosed in a Japanese Patent Application First Publication No. Heisei 8-156816 (published on Jun. 18, 1996), to an engagement force controlling apparatus of a driving force distribution clutch between the front and rear road wheels or between the left and right road wheels of either front or rear, or to an active suspension and stabilizer controlling apparatus disclosed in a Japanese Patent Application First Publication No. Heisei 5-193332 (published on Aug. 3, 1993) and in which a variable control over a rolling rigidity is achieved.

It is noted that, in the embodiment, the predetermined value V1 of the vehicle speed to be compared with the absolute value |Vx| of the vehicle speed at the step S411 of FIG. 10 is a suitable value in a range between 5 to 10 Km/h, the predetermined value $\psi'_1$ of the yaw rate to be compared with the absolute value |$\psi'$| of the yaw rate at the step S410 of FIG. 10 is a suitable value, for example, approximately one degree/second, and the predetermined period of time corresponding to the predetermined value $q_1$ of the running counter q to be compared with the counted value of the running counter q at the step S415 of FIG. 10 is a suitable value between 1 and 2 seconds.

It is also noted that such a situation that the vehicle is caused to take the yawing motion with no vehicular occupant and with the feedback controller in operation so that the yaw rate $\psi'$ is developed but no steering angular displacement $\theta$ occurs, the vehicle speed Vx is zero, and the target yaw rate $\psi'$r is zero is found, for example, when the vehicle is stopped on the turn table (movable platform) to turn the vehicle to be directed toward a parking space of a vehicular parking apparatus in a multi-floor building. Such a vehicular parking apparatus as described above is exemplified by U.S. Pat. Nos. 5,437,536 issued on Aug. 1, 1995, No. 4,039,957 issued on Aug. 8, 1997, and No. 3,710,957 issued on Jan. 16, 1993 (the disclosure of which are herein incorporated by reference).

What is claimed is:

1. An apparatus for an automotive vehicle comprising:
    a yawing motion variable detector for detecting a yawing motion variable which is actually developed in the vehicle;
    a vehicular running status information detector for detecting a vehicular running status information except the yawing motion variable;
    a target yawing motion variable calculator for calculating a target yawing motion variable on the basis of the vehicular running status information;
    a vehicular stopped state determinator for determining whether the vehicle is stopped on the basis of the vehicular running status information; and
    a feedback controller for carrying out a feedback control of the yawing motion variable so that the detected yawing motion variable is coincident with the target yawing motion variable, the feedback controller having a feedback control suspender for suspending the feedback control of the yawing motion variable at least when the vehicular stopped state determinator determines that the vehicle is stopped.

2. An apparatus for an automotive vehicle as claimed in claim 1, wherein the vehicular running status information detector includes a vehicle speed detector for detecting a vehicle speed, the vehicular stopped state determinator determines whether the vehicle is stopped according to whether an absolute value of the vehicle speed is approximately zero and the feedback control suspender continues the suspension of the feedback control of the yawing motion variable when the yawing motion variable detected by the yawing motion variable detector is equal to or larger than a predetermined value, the vehicular stopped state determinator determining that the vehicle is stopped, and, thereafter, the vehicle speed detected by the vehicle speed detector detects that the vehicle speed is increased and becomes equal to or higher than a predetermined value.

3. An apparatus for an automotive vehicle as claimed in claim 2, wherein the feedback control suspender continues the suspension of the feedback control of the yawing motion variable until a predetermined period of time has passed after the vehicle speed detected by the vehicle speed detector is increased and becomes equal to or higher than the predetermined value.

4. An apparatus for an automotive vehicle as claimed in claim 1, wherein the feedback control suspender continues the suspension of the feedback control of the yawing motion variable when the yawing motion variable is equal to or larger than a predetermined value when the vehicle has started after the vehicular stopped state determinator determines that the vehicle has stopped.

5. An apparatus for an automotive vehicle as claimed in claim 1, wherein the yawing motion variable is a yaw rate and the yawing motion variable detector comprises a yaw rate sensor for detecting a yaw rate of the vehicle.

6. An apparatus for an automotive vehicle as claimed in claim 5, wherein the vehicular running status information detector comprises a vehicle speed sensor for detecting a vehicle speed, the vehicular stopped state determinator determines whether the vehicle is stopped according to whether an absolute value ($|Vx|$) of the vehicle speed is approximately zero ($V_0$) ($V' \approx 0$), and the feedback controller includes a running counter (q), the running counter (q) being cleared to zero when $|Vx| \leq V_0$; and a feedback control inhibit flag ($F_{INHB}$) which is set when the running counter (q) indicates zero.

7. An apparatus for an automotive vehicle as claimed in claim 6, wherein the feedback controller further includes a yaw rate determinator for determining whether an absolute value ($|\psi'|$) of the detected yaw rate is larger than a minute predetermined value ($\psi'_0$) ($\psi'_0 \approx 0$) when the feedback control inhibit flag ($F_{INHB}$) is set; and an external disturbance input flag ($F_{ERRY}$) which is set when $|\psi'| > \psi'_0$.

8. An apparatus for an automotive vehicle as claimed in claim 7, which further comprises: front left and right road wheel cylinders (1FL, 1FR) attached onto front left and right road wheels of the vehicle; rear left and right road wheel cylinders (1RL, 1RR) attached onto rear left and right road wheels of the vehicle; a pair of first and second actuators, each actuator controlling wheel cylinder pressures supplied to the front left and right road wheel cylinders and the first actuator controlling wheel cylinder pressures supplied to the rear left and right road wheel cylinders; and a master cylinder developing a front road wheel side master cylinder pressure $P_{MCF}$ and a rear road wheel side master cylinder pressure $P_{MCR}$, wherein the feedback controller comprises a braking force controller, and wherein, when the feedback control inhibit flag ($F_{INHB}$) is set, all of the respective wheel cylinders (1FL, 1FR, 1RL and 1RR) are uninterruptedly connected to the master cylinder.

9. An apparatus for an automotive vehicle as claimed in claim 8, wherein the braking force controller calculates a target wheel cylinder pressure $P^*i$ (i=FL, FR, and R) for each of the front left and right and rear left and right road wheel cylinders in the following equation when the feedback control inhibit flag $F_{INHB}$ is set: $P^*i=\min[P^*1i, P^*2i]$, wherein $P^*1i$ denotes a first target wheel cylinder pressure (i=FL, FR, or R) and is expressed as $P^*1_{FL}=\max[P_{FL}+\Delta Pr/2, +\Delta Pr, 0]$, $P^*1_{FR}=\max[P_{FR}-\Delta Pr/2, -\Delta Pr, 0]$, and $P^*1_R= P_{MCR}$, wherein $P_{FL}$ denotes the front left road wheel cylinder pressure, $P_{FR}$ denotes the front right road wheel cylinder pressure, $\Delta Pr$ denotes a target front road wheel side wheel cylinder pressure variation rate, min [A, B] denotes a selection of either A or B which is smaller than the other, max [A, B, C] denotes a selection of a maximum value from among A, B, and C, $P^*2i$ denotes a second target wheel cylinder pressure and is expressed as $P^*2i=\max[0, Pi+P'^*2i \cdot \Delta T]$, wherein Pi denotes each road wheel cylinder pressure, $P'^*2i$ denotes a second target road wheel cylinder pressure variation rate, $\Delta T$ denotes a predetermined sampling time, and wherein, when the feedback control inhibit flag ($F_{INHB}$) is set, the front road wheel side master cylinder pressure and the rear road wheel side master cylinder pressure are set to the corresponding front and rear road wheel side target wheel cylinder pressures $P^*i$.

10. An apparatus for an automotive vehicle as claimed in claim 9, wherein the feedback control inhibit flag ($F_{INHB}$) is continued to be set when the external disturbance input flag ($F_{ERRY}$) is set, the vehicular stopped state determinator determining that the vehicle is stopped with the absolute value $|Vx|$ of the vehicle speed being equal to or below the approximately zero ($\leq V_0$), at least until the absolute value $|Vx|$ of the the vehicle speed becomes increased from the approximately zero to a predetermined vehicle speed value ($V_1$).

11. An apparatus for an automotive vehicle as claimed in claim 9, wherein the feedback control inhibit flag (FINHB) is continued to be set at least until the absolute value $|Vx|$ of the vehicle speed becomes increased from the approximately zero to a predetermined vehicle speed value (V1) when the absolute value $|\psi'|$ of the detected yaw rate is larger than a predetermined yaw rate value ($\psi'$) even after the vehicle in the stopped state is restarted with the external disturbance input flag ($F_{ERRY}$) reset.

12. An apparatus for an automotive vehicle as claimed in claim 10, wherein the feedback control inhibit flag ($F_{INHB}$) is continued to be set when the absolute value $|Vx|$ of the vehicle speed becomes increased from approximately zero and exceeds the predetermined vehicle speed value ($V_1$) and the running counter (q) is incremented when $|Vx|>V_1$ and the incremented value of the running counter (q) is below a predetermined running counter value ($q_1$).

13. An apparatus for an automotive vehicle as claimed in claim 11, wherein the feedback control inhibit flag ($F_{INHB}$) is continued to be set when the absolute value $|Vx|$ of the vehicle speed becomes increased from approximately zero and exceeds the predetermined vehicle speed value ($V_1$) and the running counter (q) is incremented when $|Vx|>V_1$ and the incremented value of the running counter (q) is below a predetermined running counter value ($q_1$).

14. An apparatus for an automotive vehicle as claimed in claim 13, wherein the predetermined running counter value ($q_1$) corresponds to a predetermined period of time from the time when the absolute value $|Vx|$ of the vehicle speed exceeds the predetermined vehicle speed value ($V_1$).

15. An apparatus for an automotive vehicle as claimed in claim 10, wherein the external disturbance input flag (FERRY) is reset and the feedback control inhibit flag (FINHB) is reset to restart the feedback control of the yaw rate when the absolute value $|Vx|$ of the vehicle speed is increased from approximately zero ($V_0 \approx 90$), the absolute value $|\psi'|$ of the detected yaw rate in the vehicular stopped state is equal to or below a minute predetermined value ($\psi'_0 \approx 0$) so that the external disturbance input flag ($F_{ERRY}$) is reset.

16. An apparatus for an automotive vehicle as claimed in claim 10, wherein the predetermined vehicle speed value ($V_1$) ranges from five to ten km/h.

17. An apparatus for an automotive vehicle as claimed in claim 11, wherein the predetermined yaw rate value ($\psi'_1$) is approximately one degree/second.

18. An apparatus for an automotive vehicle as claimed in claim 13, wherein the predetermined period of time ranges from one second to two seconds.

19. An apparatus for an automotive vehicle comprising:
yawing motion variable detecting means for detecting a yawing motion variable which is actually developed in the vehicle;
target yawing motion variable calculating means for calculating a target yawing motion variable on the basis of a vehicular running status information;
vehicular stopped state detecting means for determining whether the vehicle is stopped; and
a feedback controlling means for carrying out a feedback control of the yawing motion variable so that the detected yawing motion variable is coincident with the target yawing motion variable, the feedback controlling means having a feedback control suspending means for suspending the feedback control of the yawing motion variable at least when the vehicular stopped state detecting means detects that the vehicle is stopped.

20. A method for controlling a yawing motion variable for an automotive vehicle, comprising the steps of:

a) detecting the yawing motion variable which is actually developed in the vehicle;

b) detecting a vehicular running status information;

c) calculating a target yawing motion variable on the basis of the vehicular running status information;

d) determining whether the vehicle is stopped on the basis of the vehicular running status information;

e) carrying out a feedback control of the yawing motion variable so that the detected yawing motion variable is coincident with the target yawing motion variable; and f) suspending the feedback control of the yawing motion variable at least when determining at the step d) that the vehicle is stopped.

21. An apparatus for an automotive vehicle comprising:

a yawing motion variable detector for detecting a yawing motion variable which is actually developed in the vehicle;

a vehicular running status information detector for detecting a vehicular running status information except the yawing motion variable;

a target yawing motion variable calculator for calculating a target yawing motion variable on the basis of the vehicular running status information;

a vehicular stopped state determinator for determining whether the vehicle is stopped on the basis of the vehicular running status information; and a feedback controller for carrying out a feedback control of the yawing motion variable so that the detected yawing motion variable is coincident with the target yawing motion variable, the feedback controller having a feedback control suspender for suspending the feedback control of the yawing motion variable at least when the vehicular stopped state determinator determines that the vehicle is stopped, and when the yawing motion variable detected by the yawing motion variable detector is equal to or larger than a predetermined value.

22. An apparatus for an automotive vehicle as claimed in claim 21, wherein the vehicular running status information detector includes a vehicle speed detector for detecting a vehicle speed, the vehicular stopped state determinator determines whether the vehicle is stopped according to whether an absolute value of the vehicle speed is approximately zero and the feedback control suspender continues the suspension of the feedback control of the yawing motion variable until the vehicle speed detector detects that the vehicle speed is increased and becomes equal to or higher than predetermined value.

* * * * *